United States Patent
Park et al.

(10) Patent No.: US 11,032,809 B2
(45) Date of Patent: Jun. 8, 2021

(54) METHOD FOR TRANSMITTING OR RECEIVING SIGNAL BETWEEN TERMINAL AND BASE STATION IN WIRELESS COMMUNICATION SYSTEM AND DEVICE FOR SUPPORTING SAME

(71) Applicant: LG Electronics Inc., Seoul (KR)

(72) Inventors: Hanjun Park, Seoul (KR); Eunsun Kim, Seoul (KR); Suckchel Yang, Seoul (KR); Yunjung Yi, Seoul (KR); Seonwook Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 16/064,837

(22) PCT Filed: Sep. 28, 2017

(86) PCT No.: PCT/KR2017/010838
§ 371 (c)(1),
(2) Date: Feb. 11, 2019

(87) PCT Pub. No.: WO2018/062899
PCT Pub. Date: Apr. 5, 2018

(65) Prior Publication Data
US 2019/0208505 A1 Jul. 4, 2019

Related U.S. Application Data

(60) Provisional application No. 62/401,147, filed on Sep. 28, 2016, provisional application No. 62/404,772, (Continued)

(51) Int. Cl.
*H04W 72/04* (2009.01)
*H04L 5/00* (2006.01)
*H04W 72/12* (2009.01)

(52) U.S. Cl.
CPC ......... *H04W 72/042* (2013.01); *H04L 5/0044* (2013.01); *H04L 5/0051* (2013.01);
(Continued)

(58) Field of Classification Search
CPC ........... H04W 72/042; H04W 72/0446; H04W 72/12; H04W 72/0453; H04L 5/0051; H04L 5/0053; H04L 5/0094; H04L 5/0044
See application file for complete search history.

(56) References Cited

U.S. PATENT DOCUMENTS

2010/0232373 A1* 9/2010 Nory ................. H04W 72/1289
370/329
2012/0113941 A1* 5/2012 Chung ................ H04L 27/2602
370/329
(Continued)

FOREIGN PATENT DOCUMENTS

WO    WO2013122436    8/2013

OTHER PUBLICATIONS

ZTE Corporation, Discussion on Control Channel Design for NR MIMO, RI-166217, 3GPP TSG RAN WG1 Meeting #86, Gothenburg, Sweden, Aug. 22-26, 2016, 7 page.
(Continued)

*Primary Examiner* — Brenda H Pham
(74) *Attorney, Agent, or Firm* — Fish & Richardson P.C.

(57) ABSTRACT

Disclosed are a method for transmitting or receiving a signal between a terminal and a base station in a wireless communication system and a device for supporting the same. More particularly, disclosed are a configuration for receiving a downlink control signal and corresponding data from a base station by a terminal when diverse numerologies are applied, and a corresponding operation configuration of the base station.

15 Claims, 23 Drawing Sheets

Related U.S. Application Data filed on Oct. 6, 2016, provisional application No. 62/417,294, filed on Nov. 3, 2016.

(52) U.S. Cl.
CPC ......... *H04L 5/0053* (2013.01); *H04L 5/0094* (2013.01); *H04W 72/0446* (2013.01); *H04W 72/0453* (2013.01); *H04W 72/12* (2013.01)

(56) References Cited

U.S. PATENT DOCUMENTS

| | | | |
|---|---|---|---|
| 2013/0039272 A1* | 2/2013 | Chen | H04W 72/042 370/328 |
| 2013/0294366 A1 | 11/2013 | Papasakellariou et al. | |
| 2013/0343311 A1* | 12/2013 | Tee | H04W 72/0453 370/329 |
| 2014/0029584 A1* | 1/2014 | Qu | H04W 72/042 370/336 |
| 2014/0169312 A1* | 6/2014 | Wang | H04W 48/12 370/329 |
| 2015/0003384 A1* | 1/2015 | Kawasaki | H04L 1/1887 370/329 |
| 2019/0280801 A1* | 9/2019 | Gao | H04L 5/0005 |

OTHER PUBLICATIONS

Huawei, "sPDCCH design for short TTI," R1-166148, 3GPP TSG RAN WG1 Meeting #86, Gothenburg, Sweden Aug. 22-26, 2016, 8 pages.

Samsung, "PDCCH Design Considerations," R1-166762, 3GPP TSG RAN WG1 #86 Gothenburg, Sweden, Aug. 22-26, 2016, 4 page.

International Search Report and Written Opinion in International Application No. PCT/KR2017/010838, dated Dec. 14, 2017, 11 pages.

\* cited by examiner

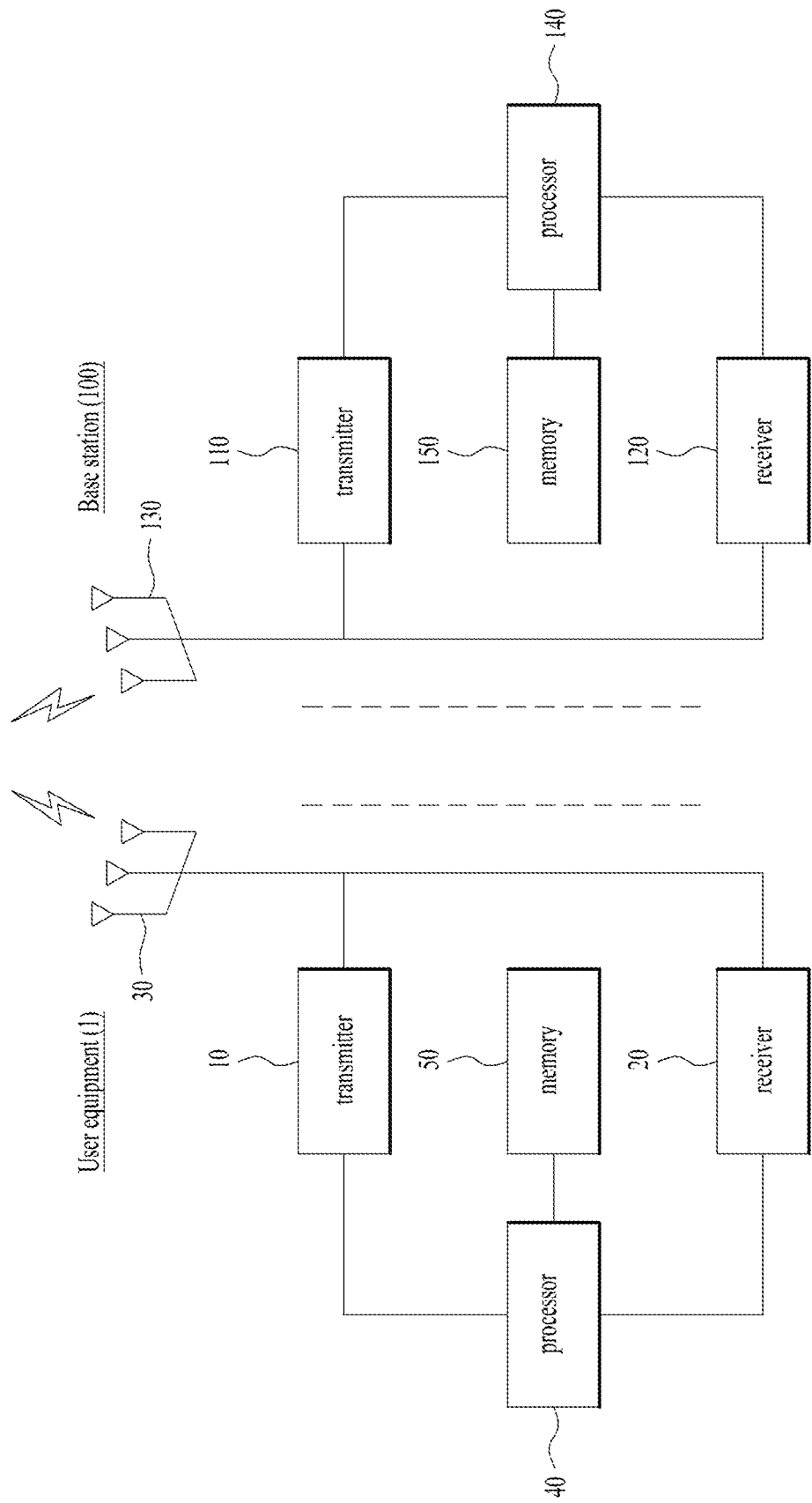

METHOD FOR TRANSMITTING OR RECEIVING SIGNAL BETWEEN TERMINAL AND BASE STATION IN WIRELESS COMMUNICATION SYSTEM AND DEVICE FOR SUPPORTING SAME

CROSS-REFERENCE TO RELATED APPLICATIONS

This application is a National Stage application under 35 U.S.C. § 371 of International Application No. PCT/KR2017/010838, filed on Sep. 28, 2017, which claims the benefit of U.S. Provisional Application No. 62/417,294, filed on Nov. 3, 2016, U.S. Provisional Application No. 62/404,772, filed on Oct. 6, 2016, and U.S. Provisional Application No. 62/401,147, filed on Sep. 28, 2016. The disclosures of the prior applications are incorporated by reference in their entirety.

TECHNICAL FIELD

The following description relates to a wireless communication system, and more particularly, to a method for transmitting or receiving signals between a terminal (or a user equipment) and a base station in a wireless communication system to which various numerologies are applicable, and a device supporting the same.

More specifically, the following description includes a description of a method for receiving, by a user equipment, a downlink control signal and corresponding data from a base station when various numerologies are applied, and a corresponding operation of a base station.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention devised to solve the problem lies in a method for transmitting or receiving signals between a user equipment and a base station in a newly proposed communication system.

In particular, it is an object of the present invention to provide a configuration in which a user equipment receives a downlink control signal from a base station and receives a data signal based on the received downlink control signal when signals are transmitted and received by applying various numerologies in a newly proposed communication system, and a corresponding configuration of a base station.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides methods and devices for transmitting or receiving signals between a user equipment and a base station in a wireless communication system.

In one aspect of the present invention, provided herein is a method for receiving a signal from a base station by a user equipment in a wireless communication system, the method including receiving control information through one or more of a first downlink control region indicated by system information and a second downlink control region configured by the base station, and receiving data scheduled by the control information.

In another aspect of the present invention, provided herein is a method for transmitting a signal to a user equipment by a base station in a wireless communication system, the method including transmitting control information through one or more of a first downlink control region indicated by system information and a second downlink control region configured by the base station, and transmitting data scheduled by the control information.

In another aspect of the present invention, provided herein is a user equipment for receiving a signal from a base station in a wireless communication system, the user equipment including a receiver, and a processor connected to the receiver, wherein the processor is configured to receive control information through one or more of a first downlink control region indicated by system information and a second downlink control region configured by the base station, and receive data scheduled by the control information.

In another aspect of the present invention, provided herein is a base station for transmitting a signal to a user equipment in a wireless communication system, the base station including a transmitter, and a processor connected to the transmitter, wherein the processor is configured to transmit control information through one or more of a first downlink control region indicated by system information and a second downlink control region configured by the base station, and transmit data scheduled by the control information.

Herein, a time resource of the first downlink control region may be a transmission time interval in which the system information is transmitted, wherein a frequency resource of the first downlink control region may be a frequency band indicated by the system information, wherein a numerology applied to the first downlink control region may be indicated by the system information.

When the control information is transmitted through the first downlink control region, the control information may include information about a numerology of scheduling target data, information about a subband in which the scheduling target data is transmitted, and time-dimension offset information about the scheduling target data.

Herein, when the control information is transmitted through the first downlink control region, a numerology applied to the control information may be different from the numerology of the scheduling target data.

When the control information is transmitted through the first downlink control region, different demodulation reference signal (DM-RS) scrambling may be applied to the control information according to a type of the control information.

Herein, when a plurality of transmission reception points is included in a cell operated by the base station, the different DM-RS scrambling may include first DM-RS scrambling distinguished for each of the transmission reception points, and second DM-RS scrambling configured not to be distinguished for each of the transmission reception points in the cell.

A numerology applied to the second downlink control region may be identical to a numerology for the data scheduled by the control information.

When the control information is transmitted through the second downlink control region, the control information may include information about presence or absence of a search space in the second downlink control region, detection time information about a search space included in the second downlink control region, and information about the number of times of blind detection for the second downlink control region.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, when a newly proposed wireless communication system (e.g., an NR system) supports a variety of numerologies, a user equipment may receive a control signal and data scheduled by the control signal from a base station without signaling overhead.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 25 is a diagram illustrating configurations of a UE and a base station capable of being implemented by the embodiments proposed in the present invention.

BEST MODE

Figure 1:
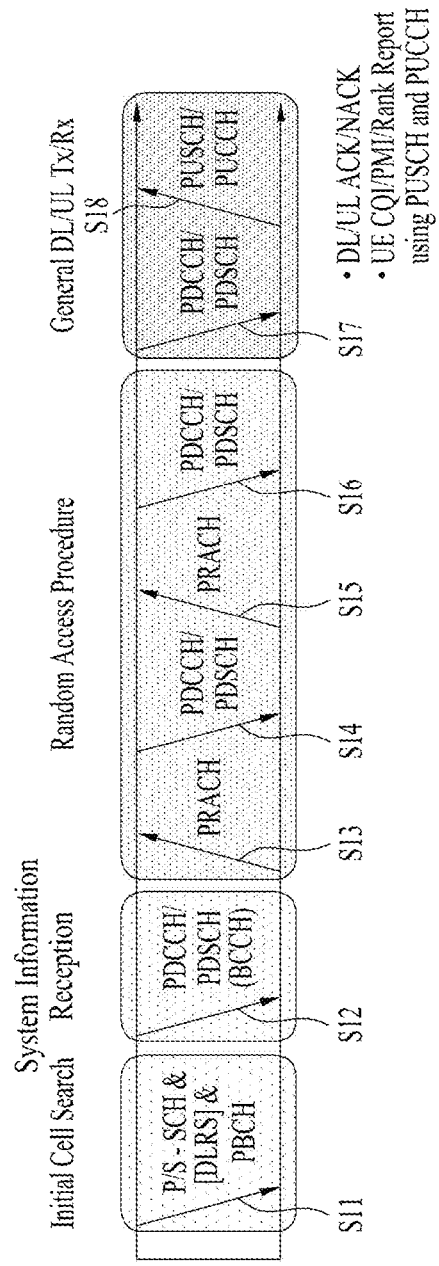
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
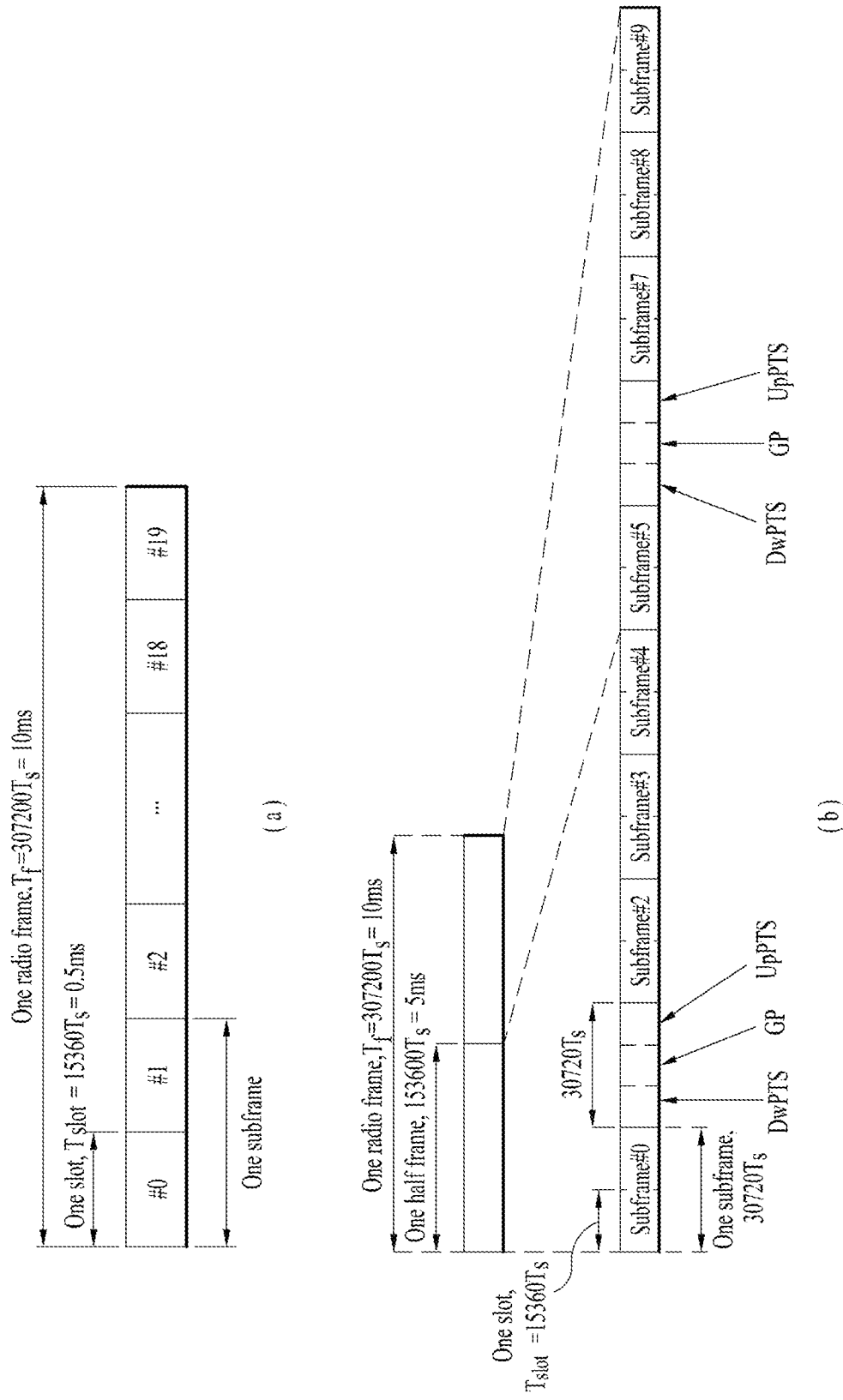
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). $T_s$ is a sampling time given as $T_s$=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An ith subframe includes 2ith and (2i+1)th slots each having a length of 0.5 ms ($T_{slot}$=15360·$T_s$). $T_s$ is a sampling time given as $T_s$=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
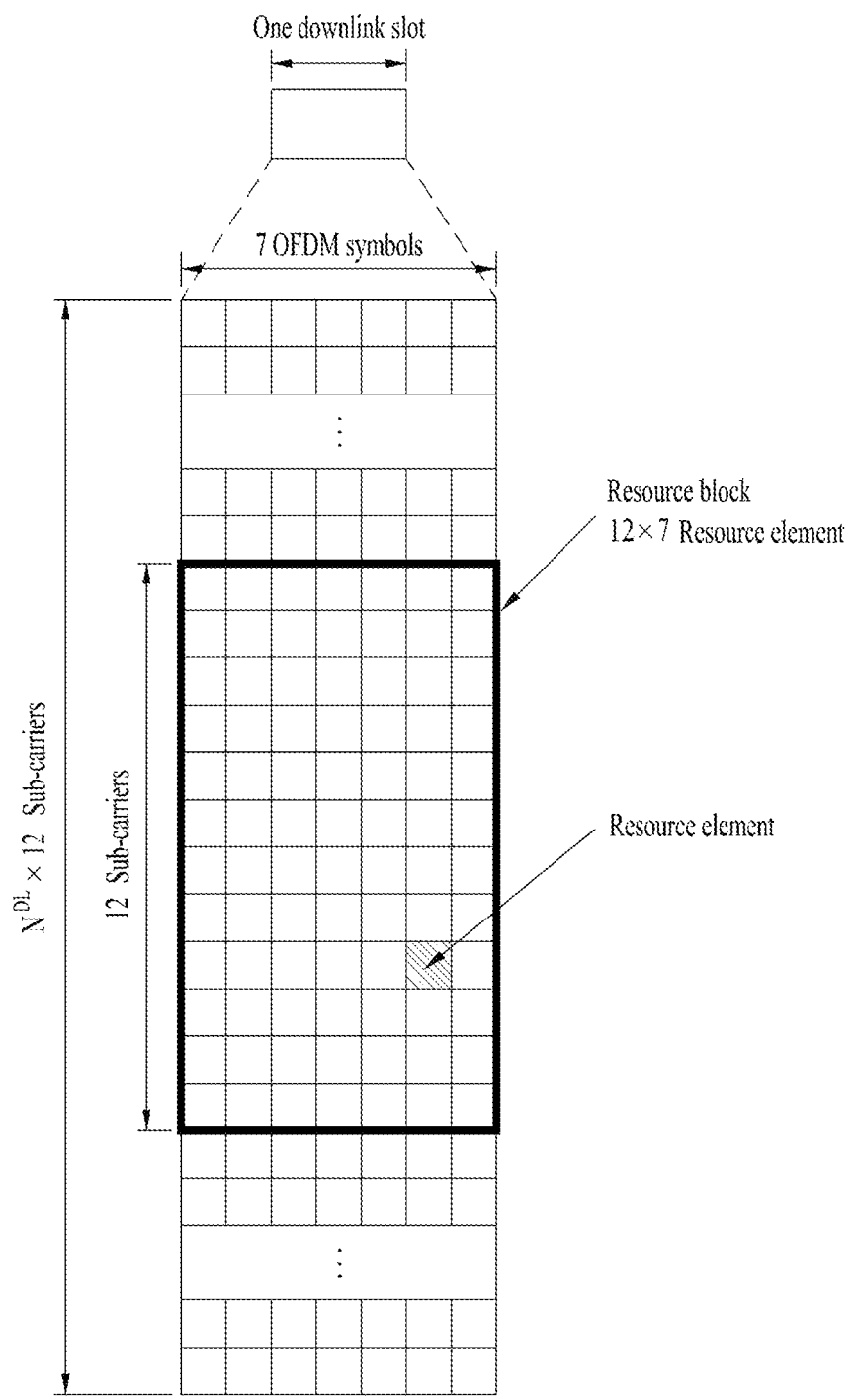
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
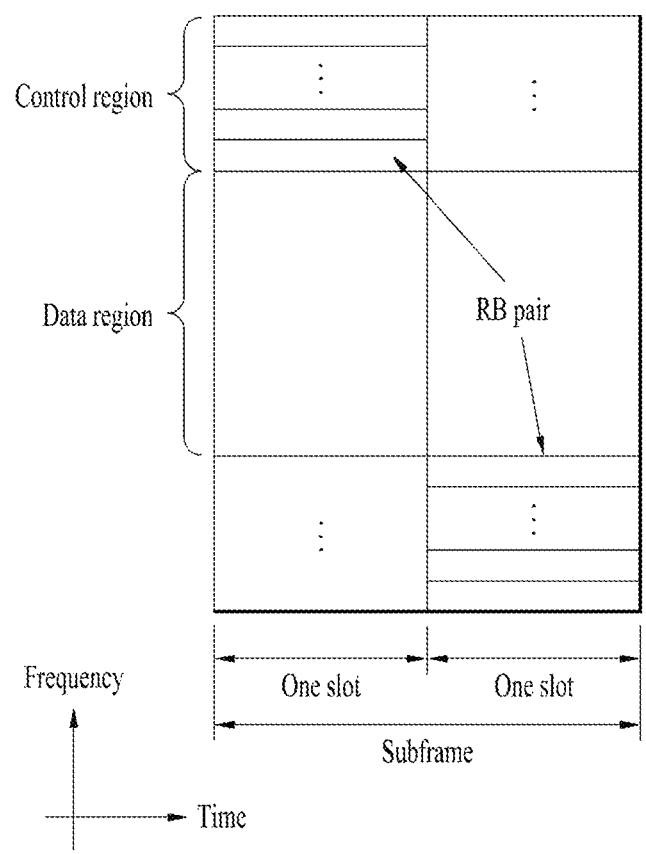
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
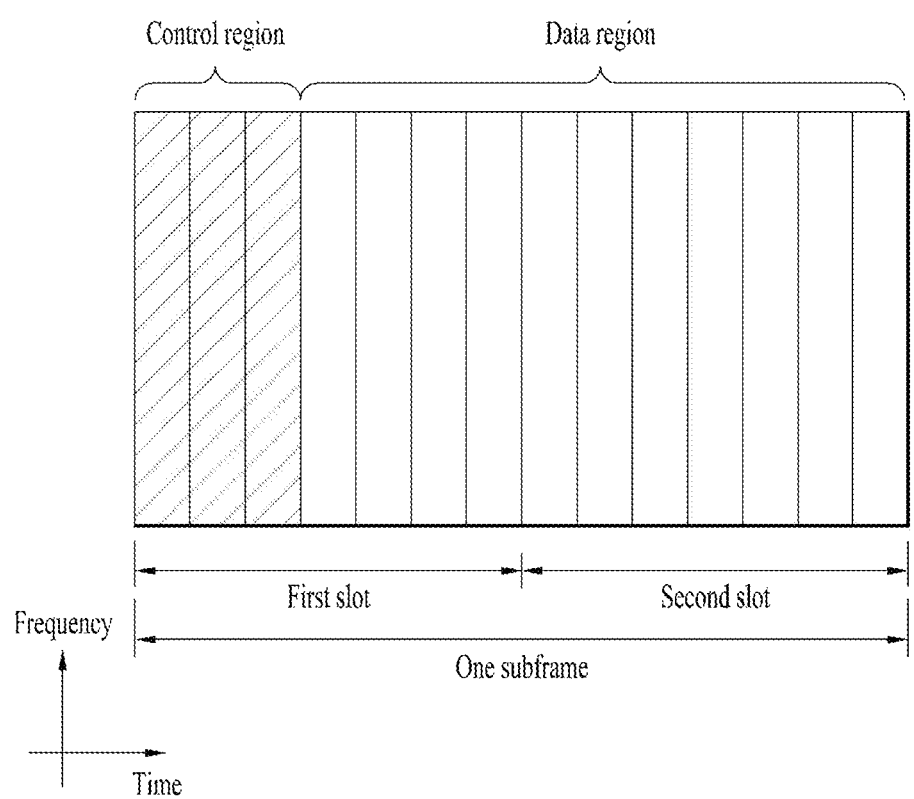
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement, and measure the RSRP or RSRQ according to the information of 'measConfig'.

Here, RSRP, RSRQ, and RSSI disclosed in the LTE system may be defined as follows.

First, reference signal received power (RSRP) is defined as the linear average over the power contributions (in [W]) of the resource elements that carry cell-specific reference signals within the considered measurement frequency bandwidth. For example, for RSRP determination the cell-specific reference signals $R_0$ shall be used. If the UE can reliably detect that $R_1$ is available it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE), which is transmitted on system information block type 3, in SIB3. Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 6:
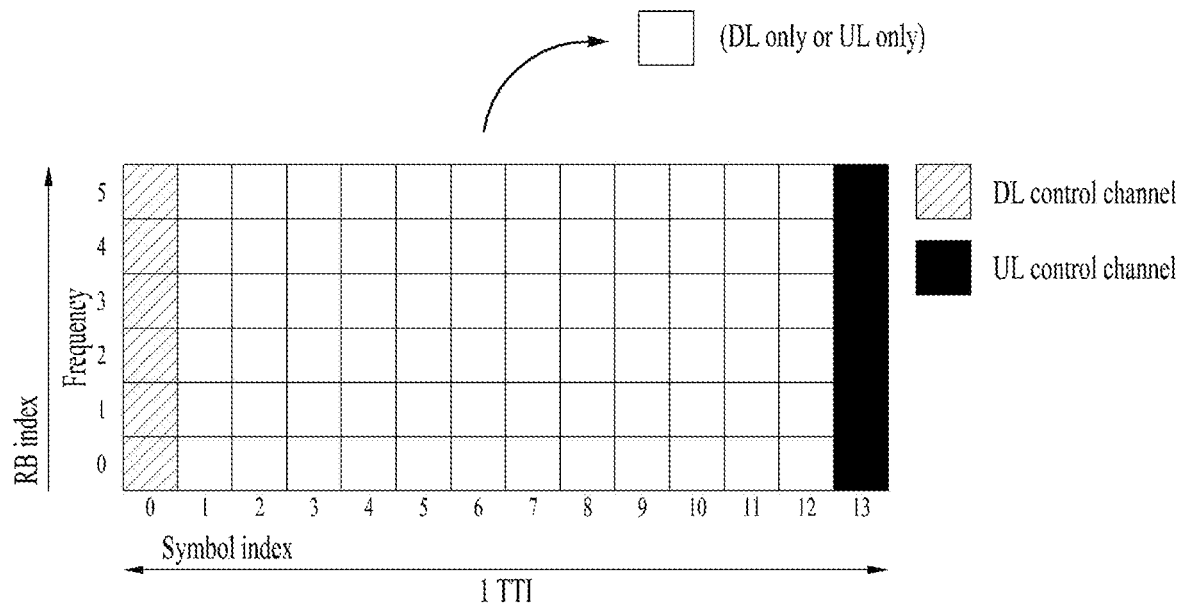
FIG. 6 is a diagram illustrating a self-contained subframe structure applicable to the present invention.

FIG. 6 is a diagram illustrating a self-contained subframe structure applicable to the present invention.

In the NR system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefore may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix (CP) length | 1.04 μs/ 0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/ 4.69 μs | 2.60 μs/ 2.34 μs | 1.30 μs/ 1.17 μs | 0.65 μs/ 0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
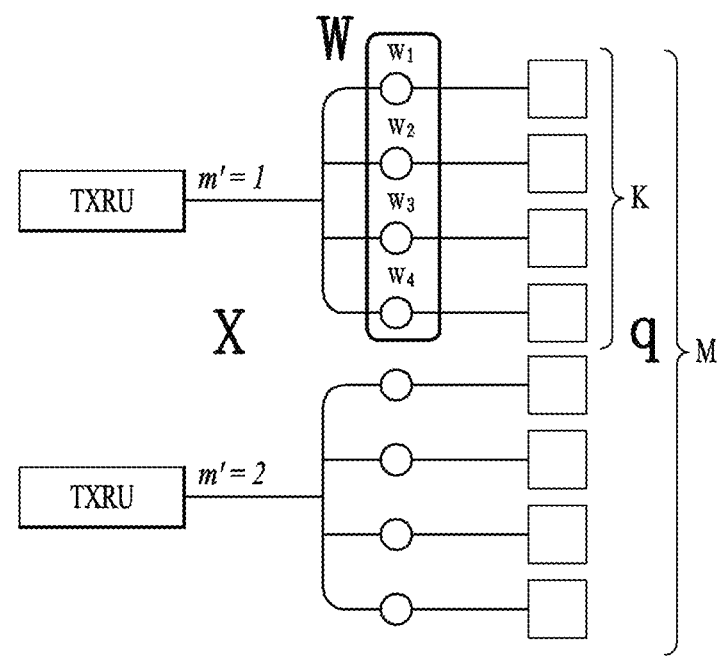
FIGS. 7 and 8 are diagrams illustrating representative methods for connecting TXRUs to antenna elements.
Figure 8:
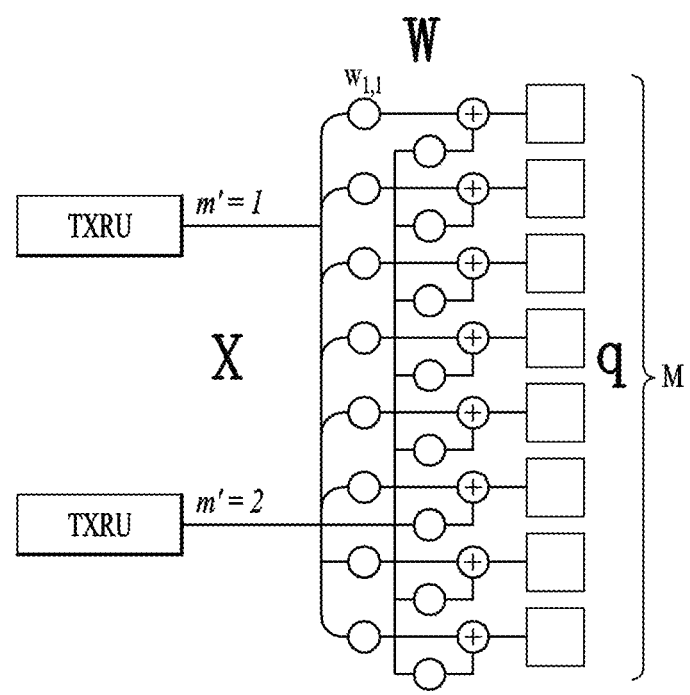

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in an NR system to which the present invention is applicable, a hybrid beamforming technique combining digital beamforming and analog beamforming may be employed. Herein, analog beamforming (or Radio Frequency (RF) beamforming) refers to an operation of precoding (or combining) at the RF stage. In hybrid beamforming, the baseband stage and the RF stage perform precoding (or combining), respectively. Therefore, the number of RF chains and the number of digital-to-analog (D/A) (or analog-to-digital (A/D)) converters may be reduced, while achieving performance close to digital beamforming.

For simplicity of explanation, the hybrid beamforming structure may be represented by N transceiver units (TXRUs) and M physical antennas. In this case, digital beamforming for L data layers to be transmitted by the transmission end may be represented by an N*(N by L) matrix. The N converted digital signals obtained thereafter may be converted into analog signals via the TXRUs, and analog beamforming represented by an M*N (M by N) matrix is applied to the converted signals.

Figure 9:
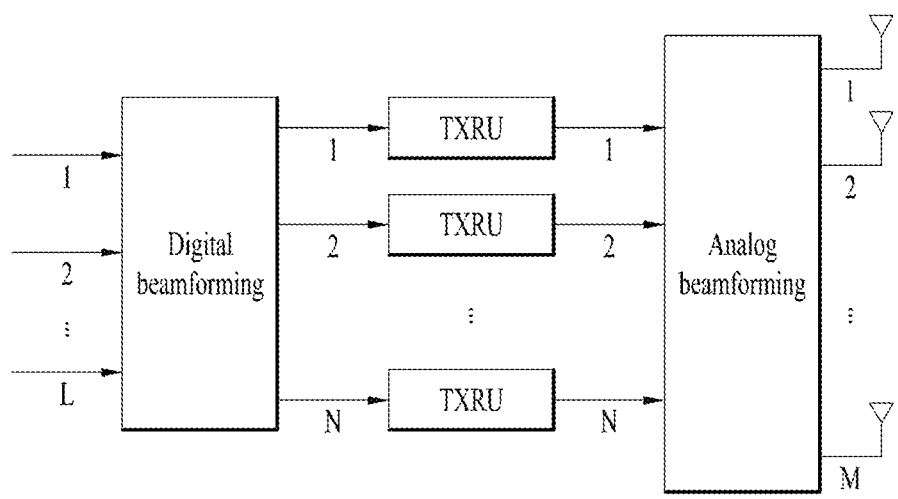
FIG. 9 is a diagram schematically illustrating a hybrid beamforming structure from the perspective of a TXRU and a physical antenna according to an embodiment of the present invention.

FIG. 9 is a diagram schematically illustrating a hybrid beamforming structure from the perspective of a TXRU and a physical antenna according to an embodiment of the present invention. In FIG. 9, the number of digital beams is L, and the number of analog beams is N.

Additionally, in the NR system to which the present invention is applicable, a method for supporting more efficient beamforming for a UE located in a specific area by designing the base station so as to change the analog beamforming on a symbol-by-symbol basis is being considered. Further, as shown in FIG. 9, when N specific TXRUs and M RF antennas are defined as one antenna panel, a plurality of antenna panels to which independent hybrid beamforming is applicable may be employed in the NR system according to the present invention.

When the base station utilizes a plurality of analog beams as described above, analog beams advantageous for signal reception may differ from UE to UE. Accordingly, in the NR system to which the present invention is applicable, a beam sweeping operation in which the base station transmits signals (at least a synchronization signal, system information, paging, and the like) by applying different analog beams on respective symbols in a specific subframe (SF) to allow all UEs to have a reception opportunity is being considered.

Figure 10:
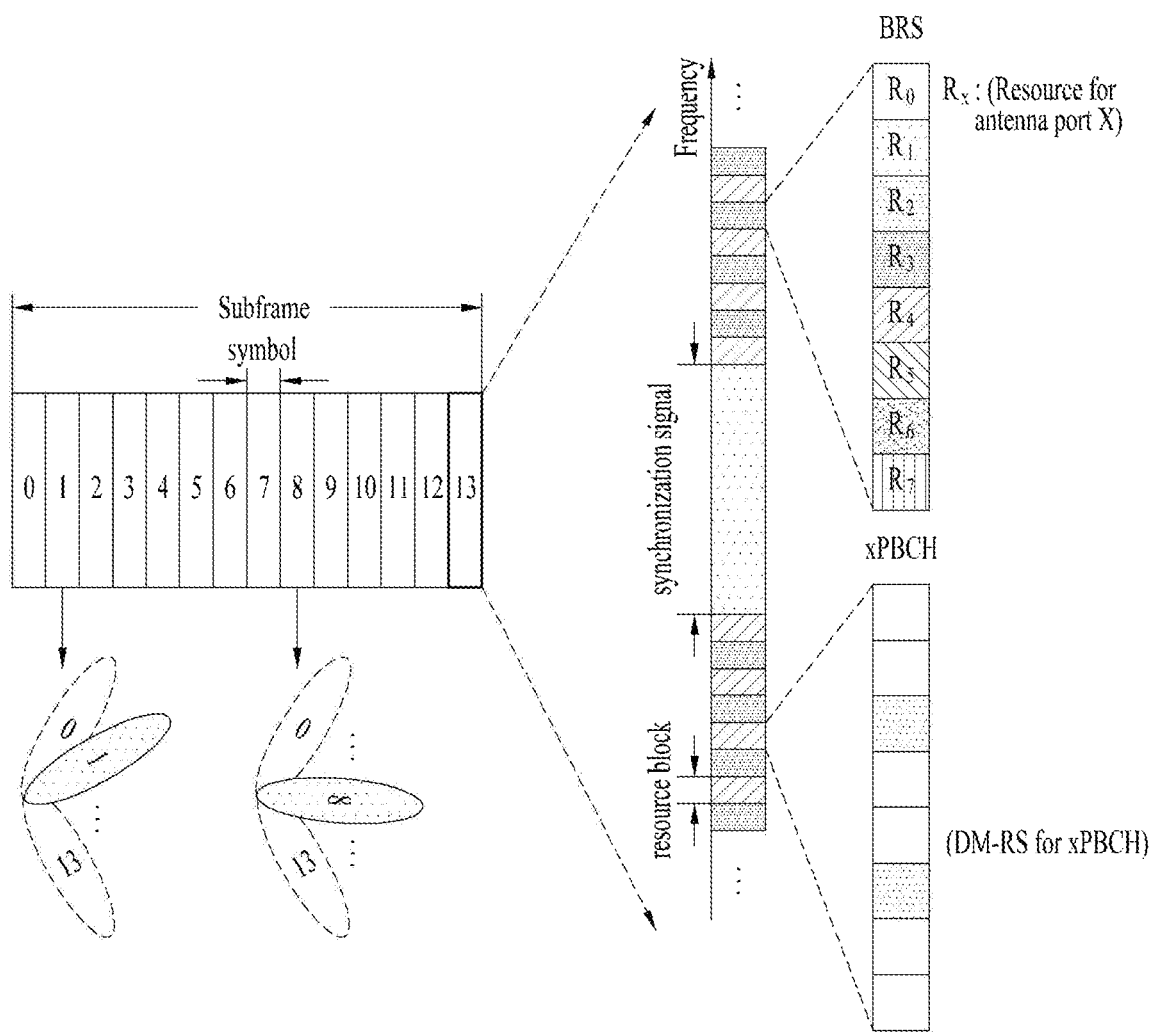
FIG. 10 is a diagram schematically illustrating a beam sweeping operation for a synchronization signal and system information in a downlink (DL) transmission process according to an embodiment of the present invention.

FIG. 10 is a diagram schematically illustrating a beam sweeping operation for a synchronization signal and system information in a downlink (DL) transmission process according to an embodiment of the present invention.

In FIG. 10, a physical resource (or a physical channel) on which system information of the NR system to which to the present invention is applicable is transmitted in a broadcasting manner is referred to as an xPBCH (physical broadcast channel). Here, analog beams belonging to different antenna panels within one symbol may be simultaneously transmitted.

In addition, as shown in FIG. 10, in the NR system to which the present invention is applicable, introduction of a beam reference signal (BRS), which is a reference signal (RS) transmitted by applying a single analog beam (corresponding to a specific antenna panel), is being discussed as an element for measuring a channel for each analog beam. The BRS may be defined for a plurality of antenna ports, and each antenna port of the BRS may correspond to a single analog beam. At this time, unlike the BRS, the synchronization signal or the xPBCH may be transmitted by applying all the analog beams in an analog beam group such it is well received by any UE.

3. Proposed Embodiments

Hereinafter, configurations proposed by the present invention will be described in detail based on the technical configurations described above.

In the NR system to which the present invention is applicable, introduction of a network slicing technique for implementing a plurality of logical networks on a single physical network is being discussed. The logical networks must be capable of supporting services having various requirements (e.g., Enhanced Mobile Broadband (eMBB), massive Machine Type Communication (mMTC), Ultra Reliable Low Latency Communication (URLLC), etc.).

In the physical layer system of the NR system to which the present invention is applicable, a method for supporting orthogonal frequency division multiplexing (OFDM) in which a variable numerology is applicable according to the various services is being discussed. Here, the variable numerology may mean that the length of the OFDM symbol, the subcarrier spacing, and the like may be variably configured. In other words, in the NR system to which the present invention is applicable, an OFDM scheme (or a multiple access scheme) in which independent numerologies are applied in each time and frequency resource region is applicable.

In addition, as data traffic rapidly increases due to the emergence of smart devices in recent years as described above, it is required to support higher communication capacity (e.g., data throughput) in the NR system to which the present invention is applicable. Thus, in order to increase the communication capacity in the NR system to which the present invention is applicable, performing data transmission using a plurality of transmission (or reception) antennas may be considered. In this case, to apply digital beamforming to the plurality of antennas, an RF chain (e.g., a chain including RF devices such as a power amplifier and a down converter) and a D/A (or A/D) converter are needed. However, this structure may not be practical since it causes high hardware complexity and high power consumption. Therefore, in the NR system to which the present invention is applicable, consideration is given to application of a hybrid beamforming technique of combining digital beamforming and analog beamforming to utilize a plurality of antennas.

In addition, in the NR system to which the present invention is applicable, a method for a plurality of TRPs to constitute one cell is being discussed, unlike legacy wireless communication systems such as LTE, in which one base station forms one cell. If a plurality of TRPs constitutes one cell, a communication service may be seamlessly supported for a specific UE even if the TRP serving the specific UE is changed, and management of mobility of the UE may be easy.

Figure 11:
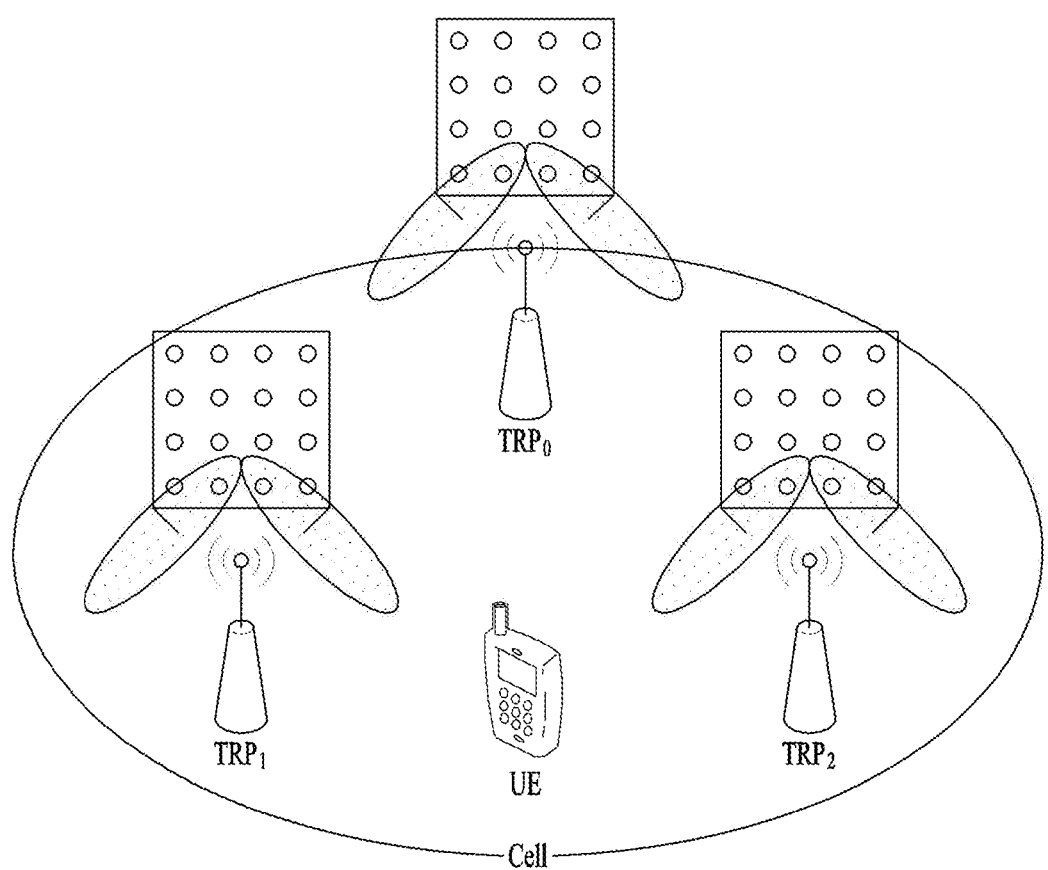
FIG. 11 is a diagram illustrating an example of a single cell composed of three TRPs (e.g., $TRP_0$, $TRP_1$, and $TRP_2$) according to an embodiment of the present invention.

FIG. 11 is a diagram illustrating an example of a single cell composed of three TRPs (e.g., $TRP_0$, $TRP_1$, and $TRP_2$) according to an embodiment of the present invention.

As shown in FIG. 11, data transmission and reception may be performed between the TRPs constituting a single cell over a backhaul network having very low latency, the boundaries of subframes (SFs) or transmission time intervals (TTIs) may be aligned between the TRPs.

Each of the TRPs may transmit signals in a plurality of beam directions according to the hybrid beamforming (or analog beamforming) technique. At this time, for the single TXRU of each TRP, only a specific-direction analog beam is applicable at a specific time. If the single TXRU is used to transmit a signal in a plurality of analog beam directions, the single TXRU should transmit the signal in an analog beam direction for each time resource in a plurality of time resources distinguished from each other. As described above, the operation of the TXRU of changing the analog beam direction per TXRU for a plurality of time resources may be called a beam sweeping operation.

As described above, in the case of the NR system to which the present invention is applicable, the numerology applied to data may be varied in a wireless communication system including a base station and a UE, one cell may include at least one transmission and reception point (TRP) and each TRP may perform signal transmission in a plurality of analog beam directions according to the hybrid beamforming (or analog beam forming) technique. Hereinafter, a method for configuring a DL control region and a search space based on the technical features above will be described in detail.

Herein, the DL control region refers to a time and frequency resource region in a DL SF (or TTI) in which the UE may attempt to detect a DL control signal. The DL control region may correspond to one search space or may include one or more search spaces.

Here, the search space may refer to logical (or physical) resources in which the UE actually performs detection when the UE detects downlink control information (DCI). Accordingly, the search space may be defined as physical resources within the DL control region.

Hereinafter, the base station refers to a network entity that manages the operation of the TRP(s) in a single cell, and it is assumed that there is one base station per cell.

In addition, it is assumed that a UE attempting initial access transmits, on a random access resource called a Random Access Channel (RACH), a preamble for initial access (hereinafter referred to as RACH preamble). Here, a response of the base station to the RACH preamble is referred to as a random access response (RAR).

As used herein, the fallback operation may refer to a data transmission operation commonly applicable to a transmission mode (TM), which means a specific transmission technique.

As used herein, SF (or TTI) may mean a time-dimension transmission unit for data transmission.

In addition, in this specification, the numerology may refer to a combination of a specific symbol length and/or a specific subcarrier spacing (in the OFDM system).

Hereinafter, configurations proposed by the present invention will be described in detail based on the technical assumptions disclosed above.

3.1. First Type DL Control Region (e.g., Non-Configurable DL Control Region)

Hereinafter, in the present invention, a DL control region without configurability of a base station (for time and frequency resources and/or a numerology) is referred to as a first type DL control region. In other words, the first type DL control region refers to a region in which the base station cannot arbitrarily configure time and frequency resources and/or a numerology.

3.1.1. First Embodiment Based on the First Type DL Control Region

The base station may transmit at least one of the following DCIs in a specific first type DL control region:

(1) RAR scheduling information;
(2) System information (or broadcast data) scheduling information;
(3) Unicast data scheduling information (for the fallback operation);
(4) Information for instructing (UE specific or UE common) RACH transmission.

In response, the UE may perform DCI detection, assuming the time and frequency resources and/or the numerology for the first type control region as follows.

1) The UE may assume a time resource (e.g., the position of an SF (or TTI) in which the first type DL region is present, etc.) for the first type DL control region as follows:

every SF (or TTI) (in which UL transmission is not instructed);
the same SF (or TTI) in which the synchronization signal (or system information) is transmitted; (or)
an SF (or TTI) in which RAR reception is expected.

2) The UE may assume the frequency resource for the first type DL control region as follows:

an anchor band defined based on the synchronization signal;
a band indicated in the system information; (or)
a band implied by the RACH preamble resource (transmitted by the UE).

(3) The UE may assume the numerology for the first type DL control region as follows:

a numerology applied to a synchronization signal; (or)
a (default) numerology indicated in the system information.

In the present invention, a numerology (applied to data) is applied to the first type DL control region, and therefore, UEs employing different numerologies for actual data reception may share the first type DL control region.

In this case, the SF (or TTI) position at which the first type DL control region is present may be defined based on the numerology applied to the first type DL control region.

More specifically, even if the numerology for data transmission to a specific UE is changeable, the UE may know a numerology whose configuration the UE will receive from the base station at least during the initial access procedure. Accordingly, when performing initial access, the UE may perform an operation based on a pre-agreed numerology.

For example, if the UE transmits a RACH preamble in the random access procedure and the base station transmits the RAR for the RACH preamble, the DCI for scheduling the RAR may transmitted by applying a numerology upon which the UE has pre-agreed. In this case, the base station must be capable of providing a DL control region in which the UE may attempt DCI detection using minimum information.

Thus, in the present invention, the DL control region as above is referred to as a first type control region. The UE may acquire information about the first type DL control region through the following minimum procedure.

For example, the UE may basically perform detection of a synchronization signal for a cell. The peripheral band in which the synchronization signal is transmitted may be defined as a frequency resource region of the first type DL control region. In addition, since the numerology applied to the synchronization signal may be supported by all UEs in the cell, the same numerology as that of the synchronization signal may be applied to the first type DL control region.

In this case, the first type DL control region may be uniquely defined in the cell so as to be shared by all the UEs. Alternatively, a plurality of first type DL control regions may be defined by purposes.

For example, when a RACH preamble resource transmitted by the UE implies a specific TRP in a cell, the RAR and/or unicast data scheduling information (for the fallback operation) may be transmitted through the first type DL control region (Region 1) defined according to the RACH preamble resource. On the other hand, the system information (or broadcast data) scheduling information and/or instruction information for the (UE specific or UE common) RACH transmission may be transmitted through a separate first type DL control region (Region 2) defined based on the synchronization signal or the system information.

Figure 12:
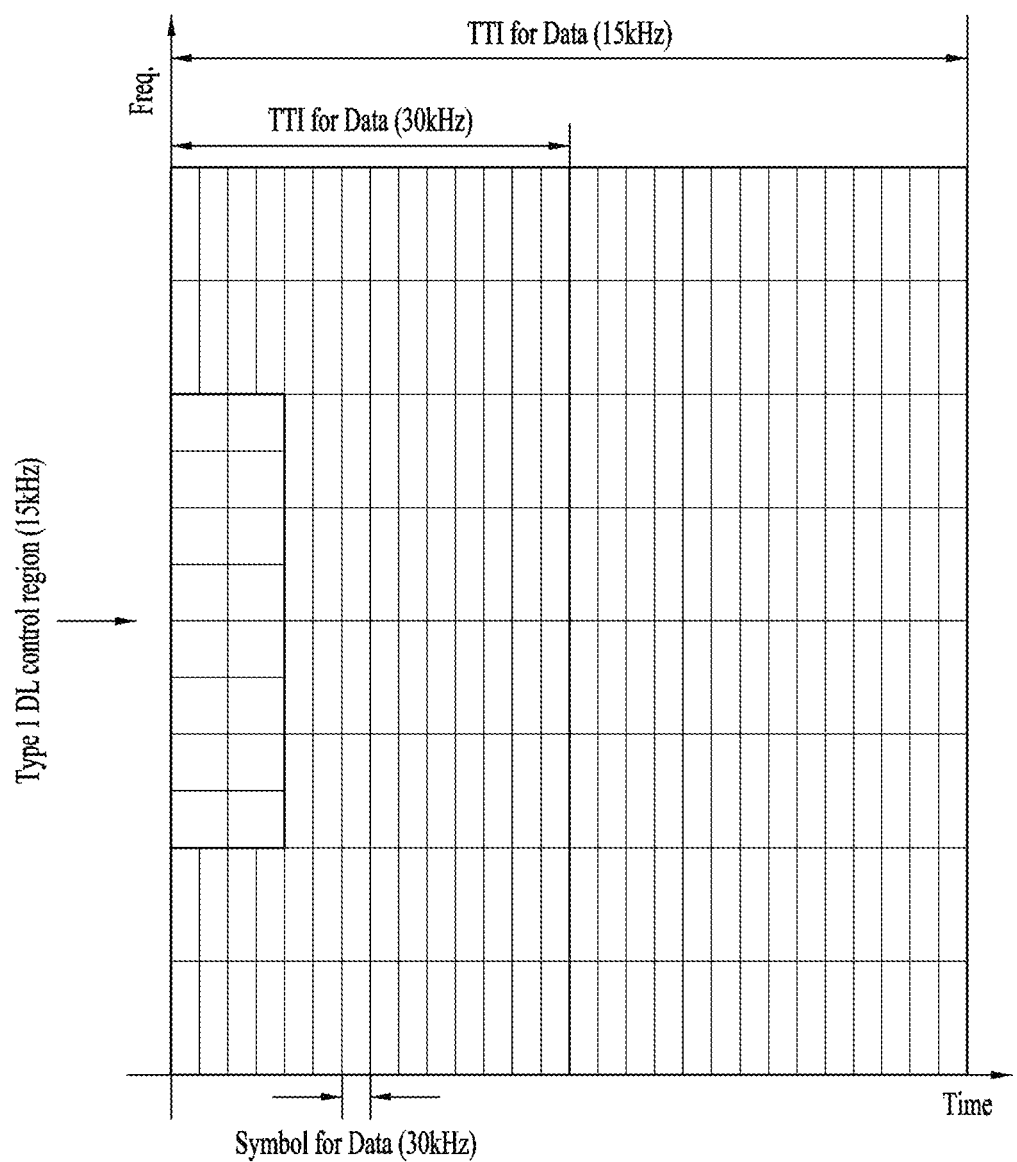
FIG. 12 is a diagram illustrating an example of configuration of a first type DL control region to which a numerology (e.g., a subcarrier spacing of 15 kHz) different from a data numerology (e.g., a subcarrier spacing of 30 kHz) is applied according to an embodiment of the present invention.

FIG. 12 is a diagram illustrating an example of configuration of a first type DL control region to which a numerology (e.g., a subcarrier spacing of 15 kHz) different from a data numerology (e.g., a subcarrier spacing of 30 kHz) is applied according to an embodiment of the present invention.

Although the first type DL control region is shown as one region in FIG. 12, the one region may be divided into two regions (Regions 1 and 2) according to the example described above.

The first embodiment based on the first type DL control region described above may be combined with other embodiments of the present invention as long as the first embodiment does not conflict with other embodiments.

3.1.2. Second Embodiment Based on the First Type DL Control Region

When the base station transmits data scheduling DCI in a specific first type DL control region, the scheduling DCI may include at least one of the following kinds of information:

numerology information for the scheduling target data;

information about the subband in which the scheduling target data is transmitted;

a time-dimension offset in which a scheduling target TTI is present (with respect to the start point of the first type DL control region).

Here, the scheduling DCI may be any DL control signal for scheduling data having different numerologies.

More specifically, it is assumed in FIG. 12 that the base station performs unicast data scheduling (for the fallback operation) of a UE in a first type DL control region defined based on the 15 kHz subcarrier spacing.

In this case, the base station may transmit data scheduled in the first type DL control region, based on the numerology (i.e., a 15 kHz subcarrier spacing) applied to the first type DL control region or on another numerology (i.e., a 30 kHz subcarrier spacing). In the latter case, in order for the UE to receive the scheduled data, the scheduling DCI transmitted in the first type DL control region may indicate a numerology for the scheduling target data and the time-dimension offset of the scheduling target TTI based on the numerology.

Figure 13:
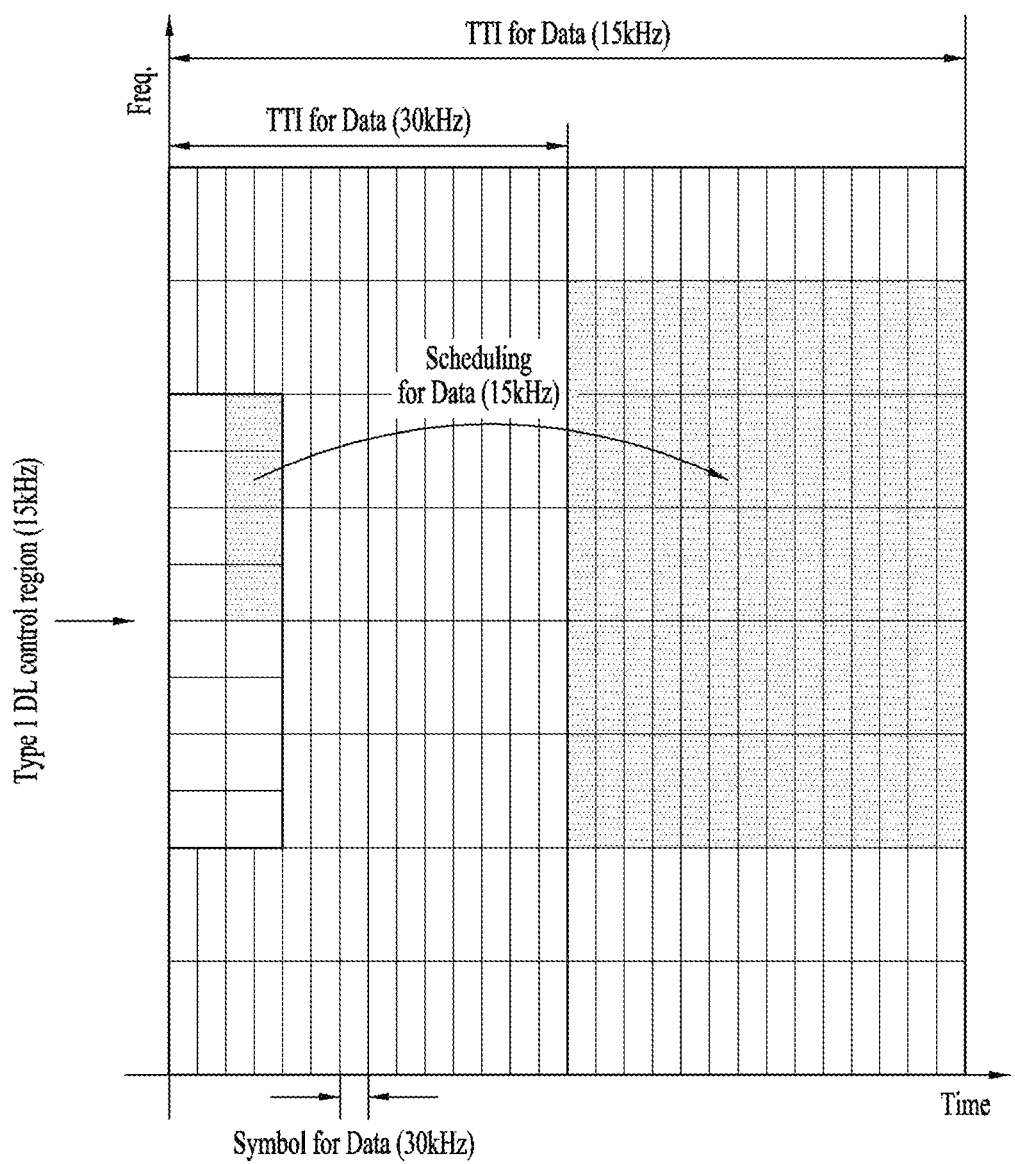
FIG. 13 is a diagram illustrating an operation of scheduling data having a TTI based on a subcarrier spacing of 30 kHz in a first type DL control region based on a subcarrier spacing of 15 kHz in a second TTI (with respect to the start point of the first type DL control region) according to the present invention.

FIG. 13 is a diagram illustrating an operation of scheduling data having a TTI based on a subcarrier spacing of 30 kHz in a first type DL control region based on a subcarrier spacing of 15 kHz in a second TTI (with respect to the start point of the first type DL control region) according to the present invention.

As shown in FIG. 13, the scheduling DCI transmitted in the first type DL control region may include, for example, numerology information about the scheduling target data.

The second embodiment based on the first type DL control region described above may be combined with other embodiments of the present invention as long as the second embodiment does not conflict with other embodiments.

3.1.3. Third Embodiment Based on the First Type DL Control Region

When the base station manages a specific first type DL control region, the base station may apply different kinds of DM-RS scrambling depending on the type of DCI to be transmitted through the first type DL control region.

(1) Option 1

1) DCI information to be transmitted by applying cell ID-based DM-RS scrambling

System information (or broadcast data) scheduling information (UE-specific or UE common) RACH transmission instruction

RAR

2) DCI information transmitted by applying RAR-based DM-RS scrambling (for example, DM-RS scrambling indicated in RAR)

Unicast data scheduling information (for the fallback operation)

(2) Option 2

1) DCI information to be transmitted by applying cell ID-based DM-RS scrambling

System information (or broadcast data) scheduling information (UE-specific or UE common) RACH transmission instruction 2) DCI information to be transmitted by applying RACH preamble resource (transmitted by the UE)-based DM-RS scrambling (e.g., DM-RS scrambling corresponding to the RACH preamble resource)

RAR

Unicast data scheduling information (for the fallback operation)

Here, the first type DL control regions for different DM-RS scrambling schemes may be distinguished from each other (on the resource region).

In addition, according to the present invention, the UE may expect detection of unicast data scheduling DCI (for the fallback operation) after RAR reception.

More specifically, the UE may expect to receive unicast data scheduling information (for the fallback operation) in a first type DL control region (Region 1) to which RAR-based DM-RS scrambling is applied. In addition, the UE may expect to receive RAR and/or system information (or broadcast data) scheduling information and/or RACH (UE specific or UE common) RACH transmission instruction in a first type DL control region (Region 2) to which cell ID based DM-RS scrambling is applied.

In this case, if the RAR can indicate DM-RS scrambling for a specific TRP in the cell, Region 1 may be a DL control region in which DM-RS scrambling is distinguished for each TRP in a cell, Region 2 may be a DL control region in which DM-RS scrambling is not distinguished for each TRP in the cell. In other words, DCI may be transmitted independently for each TRP in Region 1, but DCI may be transmitted in common for the TRPs in Region 2.

Figure 14:
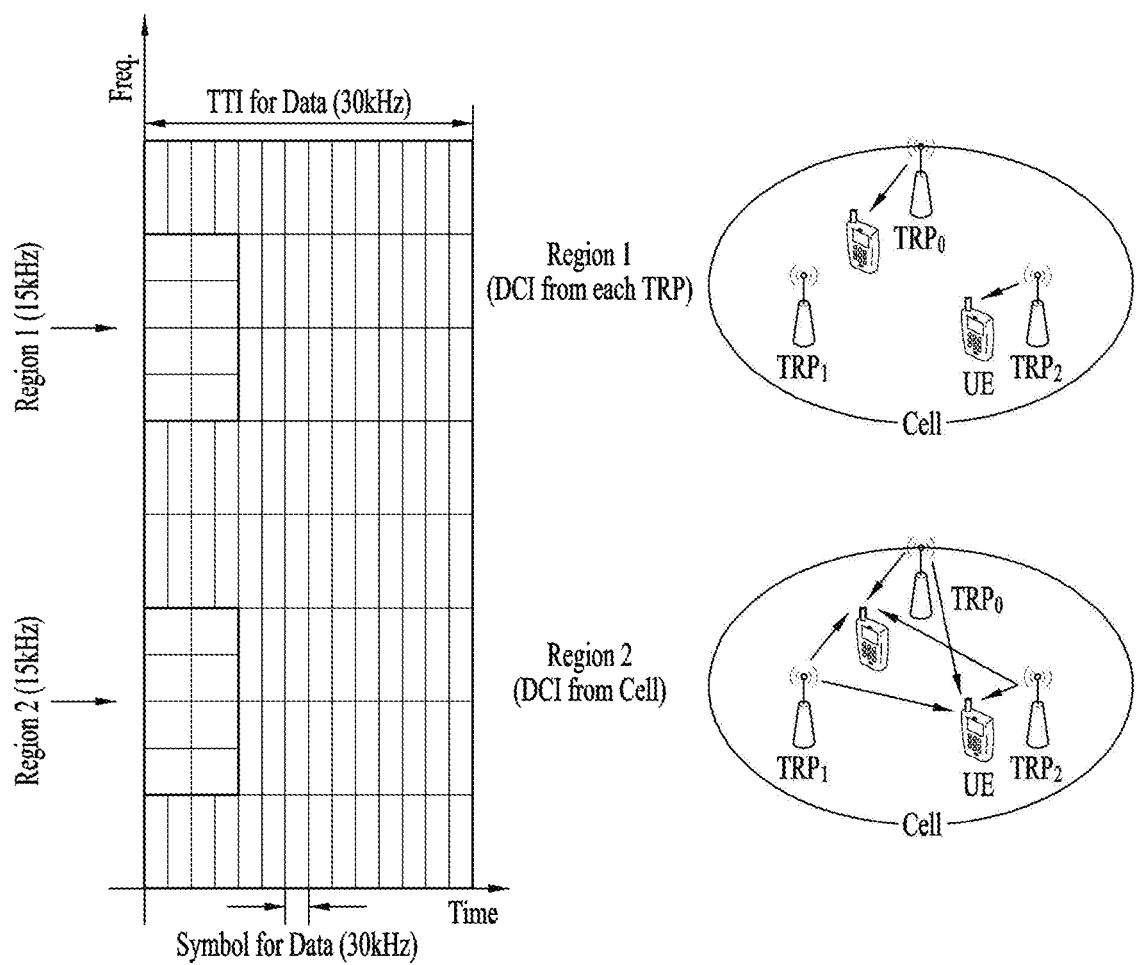
FIG. 14 is a diagram schematically illustrating an operation of transmitting a signal for each first type DL control region when there are first type DL control regions to which different kinds of DM-RS scrambling are applied, respectively, according to the present invention.

FIG. 14 is a diagram schematically illustrating an operation of transmitting a signal for each first type DL control region when there are first type DL control regions to which different kinds of DM-RS scrambling are applied, respectively, according to the present invention.

As shown in FIG. 14, when Region 1 and Region 2 are present, TRPs in Region 1 may transmit independent DCIs (e.g., RAR and fallback DCI), and TRPs in Region 2 may transmit the same DCI (e.g., system information) in the single frequency network (SFN) scheme.

In this case, if DM-RS scrambling of Region 1 is configured for a specific UE and a serving TRP having poor reception sensitivity, the base station may instruct RACH preamble transmission to the specific UE through the SFN scheme of Region 2. The new Serving TRP may then respond with the RAR to support the fallback operation (e.g., re-configure the DM-RS scrambling for Region 1).

The third embodiment based on the first type DL control region described above may be combined with other embodiments of the present invention as long as the third embodiment does not conflict with other embodiments.

3.2. Second Type DL Control Region (Configurable DL Control Region)

Hereinafter, in the present invention, a DL control region without configurability of a base station (for time and frequency resources and/or a numerology) is referred to as a second type DL control region. In other words, the second type DL control region refers to a region in which the base station can arbitrarily configure time and frequency resources and/or a numerology.

3.2.1. First Embodiment Based on the Second Type DL Control Region

The base station may transmit at least one of the following DCIs in a specific second type DL control region:

(1) Unicast data scheduling information (for the normal operation);

(2) Unicast data scheduling information (for the fallback operation);

(3) System information (or broadcast data) scheduling information.

In addition, the base station may include the following information for each DCI in the second type DL control region:

1) Whether transmission is supported for the corresponding DCI;

2) Detection time for the corresponding DCI;

3) Number of times of blind detection (BD) of the corresponding DCI.

Here, whether transmission is supported for each DCI may be represented by the presence or absence of a search space in which the corresponding DCI is included, and the detection time of each DCI may be represented by a detection time of a search region in which the corresponding DCI is included. For example, the unicast data scheduling information (for the normal operation) is transmitted through a UE-specific search space, and the unicast data scheduling information (for the fallback operation) and/or system information (or broadcast data) scheduling information may be transmitted through a UE common search space.

More specifically, if the UE has received a configuration of a numerology to be applied to data, the same numerology as the numerology to be applied to the data may be applied to the DL control region. For example, if the 30 kHz subcarrier spacing is applied to the data and the 15 kHz subcarrier spacing is applied to the DL control region for scheduling the data, the number of symbols from the perspective of the data numerology for the DL control region is doubled, and thus unnecessary control overhead may be caused.

Therefore, the present invention proposes that the base station configure a second type DL control region having the same numerology as the data numerology of the UE.

Figure 15:
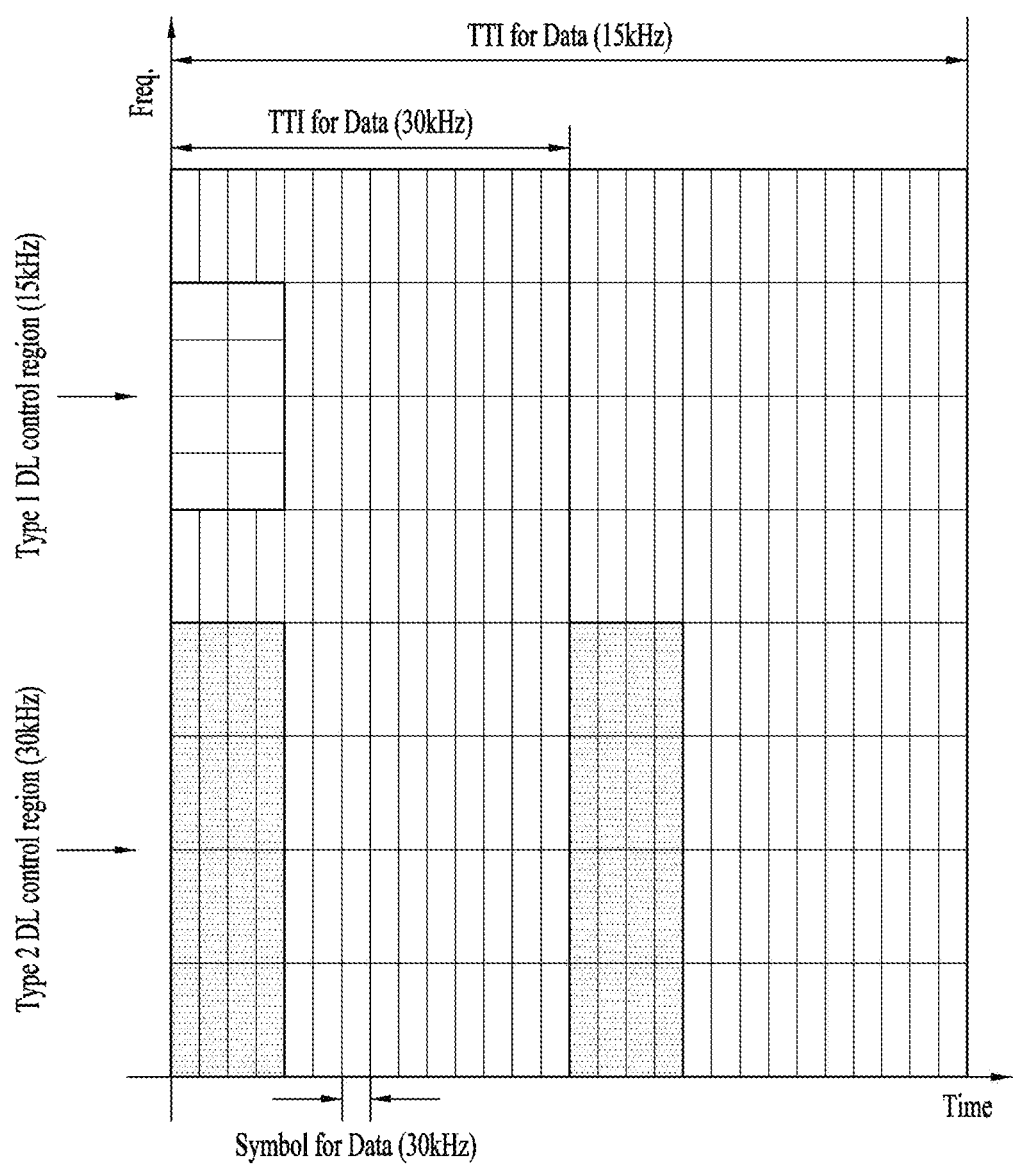
FIG. 15 is a diagram illustrating an example in which both a first type DL control region and a second type control region exist according to the present invention.

FIG. 15 is a diagram illustrating an example in which both a first type DL control region and a second type control region exist according to the present invention.

As shown in FIG. 15, the second type DL control region may be present in every TTI unit defined on the basis of the data numerology.

The first embodiment based on the second type DL control region described above may be combined with other embodiments of the present invention as long as the first embodiment does not conflict with other embodiments.

3.2.2. Second Embodiment Based on the Second Type DL Control Region

When the base station configures the second type DL control region, the base station may configure the time resource, the frequency resource and the numerology of the second type DL control region as follows:

(1) Time resource (e.g., an SF (or TTI) position at which the second type DL control region is present):

every SF (or TTI); (or)

a time interval with a certain time period;

(2) Frequency resource:

configuring a service type and applying a frequency resource corresponding (one-to-one corresponding) to the service type; (or)

arbitrarily configured by the base station;

(3) Numerology:

Configuring a service type and applying a numerology corresponding (one-to-one corresponding) to the service type; (or)

Arbitrarily configured by the base station.

More specifically, when the base station configures the second type DL control region for the UE, the time and frequency resources and the numerology for the second type DL control region may be arbitrarily configured by the base station, or may be determined according to the type of a data service to be scheduled through the DL control region.

For example, the base station may pre-define bands for each service of URLLC, mMTC, and eMBB and the respective numerologies for each service. In this case, the second type DL control region for URLLC may have the same frequency resource as the band in which the URLLC service will be provided, and the same numerology as that configured for the URLLC data may be applied thereto.

The second embodiment based on the second type DL control region described above may be combined with other embodiments of the present invention as long as the second embodiment does not conflict with other embodiments.

3.3. Search Space

In the present invention, search space A (hereinafter referred to as SS A) refers to a search space in which fallback operation-based unicast data scheduling DCI and/or broadcast data scheduling DCI may be detected.

In addition, search space B (hereinafter referred to as SS B) refers to a search space in which fallback operation-based unicast data scheduling DCI and/or (specific transmission scheme-based) unicast data scheduling DCI may be detected.

3.3.1. First Embodiment Based on Search Space

When the base station configures the first type DL control region and the second type DL control region for the UE, the search spaces for the respective DL control region may be configured and the UE may perform blind detection (BD) for each search region as follows.

(1) Option 1

1) The search space for the first type DL control region may be configured as SS A and the search space for the second type DL control region may be configured as SS B.

2) In this case, the UE may perform BD as follows.

1> BD Option 1

The UE may attempt detection for SS A and SS B in every SF (or TTI).

2> BD Option 2

The UE may attempt detection for SS A in an SF (or TTI) interval repeated at regular intervals, an SF (or TTI) configured by the base station through a higher layer signal or a resource implied through a RACH resource.

The UE may attempt detection for SS B in every SF (or TTI).

3> BD Option 3

The UE may alternately attempt SS A detection and SS B detection in SF (or TTI) resources subjected to time division multiplexing (TDM).

(2) Option 2

1) The search space for the first type DL control region may be configured as SS A and the search space for the second type DL control region may be configured as SS B.

2) In this case, the UE may perform BD as follows.

1> BD Option 1

The UE may attempt detection for the first type DL control region and the second type DL control region in every SF (or TTI).

2> BD Option 2

The UE may attempt detection for the first type DL control region in an SF (or TTI) interval repeated at regular intervals, an SF (or TTI) configured by the base station through a higher layer signal, or a resource implied through a RACH resource.

The UE may attempt detection for the second type DL control region in every SF (or TTI).

3> BD Option 3

The UE may alternately attempt detection for the first type DL control region and detection for the second type DL control region in the SF (or TTI) resources subjected to TDM.

4> BD Option 4

The UE may attempt detection for SS A in the first type DL control region in an SF (or TTI) interval repeated at regular intervals, an SF (or TTI) configured by the base station through a higher layer signal or a resource implied through a RACH resource.

The UE may attempt detection for SS A in the second type DL control region in every SF (or TTI).

The UE may attempt detection for SS B in the second type DL control region in every SF (or TTI).

5> BD Option 5

The UE may alternately attempt detection for SS A in the first type DL control region and SS A in the second type DL control region in the SF (or TTI) resources subjected to TDM.

The UE may attempt detection for SS B in the second type DL control region in every SF (or TTI).

6> BD Option 6

The UE may attempt detection for SS A in the first type DL control region in every SF (or TTI).

The UE may alternately attempt detection for SS A in the second type DL control region and detection for SS B in the second type DL control region in the SF (or TTI) resources subjected to TDM.

In the operation described above, the SF (or TTI) resources for detection for each search space may be determined according to SFs (or TTIs) defined based on a numerology applied to a DL control region including the search space.

In addition, in the operation described above, SS A may refer to a search space (e.g., a cell specific search space) in which UEs in a cell perform search in common, and SS B may refer to a search space for a specific UE (e.g., a UE specific search space).

In addition, when the base station configures the first type DL control region and the second type DL control region for the UE, the two DL control regions may be configured based on the same subband and the same numerology, or may be configured based on different subbands and different numerologies.

As a more specific example, it is assumed that BD option 1 of Option 1 is applied to the first type DL control region and the second type DL control region according to the present invention. As shown in FIG. 15, it is also assumed that a numerology of 15 kHz subcarrier spacing is applied to the first type DL control region, and a numerology of 30 kHz subcarrier spacing is applied to the second type DL control region.

In this case, the UE may perform detection for the first type DL control region and the second type DL control region in every SF (or TTI). The UE may perform detection for the first type DL control region in every SF (or TTI) (e.g., 2*T ms) according to the 15 kHz subcarrier spacing, and perform detection for the second type DL control region in every SF (or TTI) (e.g., T ms) according to the 30 kHz subcarrier spacing.

Alternatively, as in BD option 2 of Option 1 described above, the UE may perform detection for the SS A in the first type DL control region only in a predetermined period or configured SF resources rather than performing the detection in every SF. This is because the SS A is used as a region for detecting system information or scheduling DCI for the fallback operation, and therefore the impact on UE performance is small and the BD burden on the UE may be lessened even if detection is attempted at a relatively low frequency for SS A.

According to BD option 3 of Option 1 described above, the UE may perform BD on each of the first type DL control region and the second type DLD control region in SFs (or TTIs) distinguished in the time dimension. This may prevent the UE from excessively increasing the BD burden by performing BD on the first type DL control region and the second type DL control region in the same SF (or TTI).

The first embodiment based on the search spaces described above may be combined with other embodiments of the present invention as long as the first embodiment does not conflict with other embodiments.

3.3.2. Second Embodiment Based on Search Space

In the NR system to which the present invention is applicable, supporting a wide band of a network may be considered. At this time, the reception RF bandwidth supported by the UE may be smaller than the entire system bandwidth supported by the network.

Figure 16:
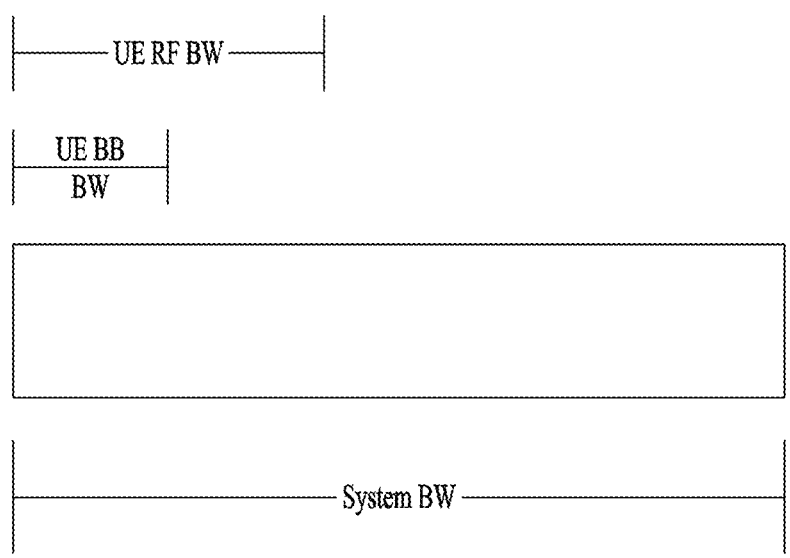
FIG. 16 is a conceptual diagram illustrating a case where an RF reception bandwidth of a UE (UE RF BW) is smaller than the entire system bandwidth (system BW) supported by a network according to the present invention.

FIG. 16 is a conceptual diagram illustrating a case where an RF reception bandwidth of a UE (UE RF BW) is smaller than the entire system bandwidth (system BW) supported by a network according to the present invention.

As shown in FIG. 16, the BW for performing the baseband operation of the UE (UE BB BW) may be smaller than the UE RF BW.

Hereinafter, a detailed description will be given of a method for designing a cell specific search space (CSS) and a user specific search space (USS) in the NR system to which the present invention is applicable when the UE RF BW of the UE is smaller than the system BW as shown in FIG. 16. Here, the RF BW of the UE may be a bandwidth that is supportable by one RF or a plurality of RFs. Herein, having the RF BW of the UE smaller than the system BW may include a case where the RF BW is determined by the UE capability, a case where the RF BW is dynamically changed by dynamically turning off one or more RFs, and a case where the UE dynamically/statically receives a configuration of a small BW from the network. In addition, having the RF BW of the UE smaller than the system BW may include all cases where the BW of the network is different from the BW monitored by the UE due to the above and other factors.

Hereinafter, a search space (SS) may be defined as a logical (or physical) resource in which the UE may perform detection of downlink control information (DCI), wherein CSS represents an SS in which DCI to be detected in a UE common manner is transmitted and USS represents an SS in which DCI to be detected in a UE specific manner may be transmitted. In particular, in the present invention, the USS may refer to time and frequency resources in which UE specific DCI (i.e., DCI detected UE-specifically) is transmitted, as a resource region defined for a UE group in common. The resource positions at which each UE actually performs detection in the USS may be classified into physical (or logical) resources by a hashing function or the like (which may be different from the definitions in LTE).

Hereinafter, in the present invention, a control subband refers to a frequency-dimension subband in which a specific DL control channel may be transmitted. As an example, the control subband for the CSS may be different from the control subband for the USS. The time dimension of the control subband may be determined by one of the following cases, or a combination thereof, or may be configured separately therefrom:

one slot or TTI;

an OFDM symbol or a preset number of OFDM symbol(s);

a dynamically indicated number of OFDM symbol(s).

In addition, the position of the control subband in the time dimension may be variously determined to be, for example, a starting point of a specific slot, in a specific slot, or a specific position over a plurality of slots.

Therefore, the control subband may be determined by a combination of time and frequency resources. In the following description, for simplicity of explanation, it is assumed that the configuration of a control subband is considered in terms of frequency resources.

Based on the assumption above, the base station may configure, through a pre-agreed method, system information or a synchronization signal resource, one or more cell-specific CSSs (CSSs) in which a resource region (e.g., time and frequency resources) for the UE, and the UE may detect scheduling DCI (or DCI) about one or more data of the followings in the cell-specific CSS:

(1) System information block (SIB);

(2) A response message corresponding to PRACH transmission;

(3) A response message corresponding to contention based transmission (e.g., A/N, retransmission, etc.);

(4) Response or broadcast request messages to a group of UEs (e.g., SIB update query):

this can be combined with a paging message where one field may indicate the purpose (e.g., SIB update query, paging or SIB update);

Contention resolution messages (e.g., Contention Resolution Identity) such as Msg. 4 in the random access procedure;

(6) Paging and/or system information update;

(7) SC-PTM (single cell-point to multiple UE);

(8) MBMS (Multimedia Broadcast Multicast Service);

(9) TPC (Transmit Power Control);

(10) Emergency data;

(11) Any services targeting a group of UEs (possibly including new services).

Here, the system information may be a broadcast channel (BCH) or an SIB.

In addition, when there is a plurality of (cell-specific) CSSs, the CSSs may have physically (or logically) distinguished resources. In one example, the CSSs may be configured in different control subbands.

Further, the purposes of use of the DCIs transmitted through the respective (cell-specific) CSSs may be distinguished from each other. For example, CSS-SIB, CSS-RAR, CSS-Msg. 4, and CSS-Paging may be transmitted through different CSSs.

Further, the numerology applied to the (cell-specific) CSSs may conform to a numerology applied to the synchronization signal or may be indicated by the system information (e.g., broadcast channel or SIB). In addition, the numerology of data scheduled by each control channel may conform to the numerology of the control channel or be configured in the same way as the CSS configuration. The features above may be applied to the case of the USS as well.

A separate numerology may be configured for semi-statically configured data such as semi-persistent scheduling (SPS). Accordingly, when a specific UE needs to process different numerologies in one resource, it may be assumed that the UE processes only one of the numerologies according to priorities (e.g., the dynamic scheduling PDSCH is prioritized over the SPS) or the like.

More specifically, in the NR system to which the present invention is applicable, the UE RF BW may be different from the entire system BW. In this case, the UE must have a search space for detecting the DL control information before it receives UE-specific configuration information.

The search space may be a (cell-specific) CSS. For example, the search space may be designed based on the minimum bandwidth (minimum BW) supported by the UE and the network, and be configured at a resource position indicated by the PBCH. If the system bandwidth is indicated by the PBCH the minimum bandwidth supported by the network is less than the minimum bandwidth supported by the UE, the position at which the CSS is transmitted may be within the system bandwidth. In the opposite case (for example, if the system bandwidth is not indicated by the PBCH), the position at which the CSS is transmitted may be configured according to the position of the PBCH resource in the minimum bandwidth of the UE.

Accordingly, the UE receiving the PBCH after cell selection may perform downlink control information (DCI) detection in the cell-specific CSS. The DCI supported in the (cell-specific) CSS may include DCIs of items (1), (2), (3), . . . , (10), (11) above.

Figure 17:
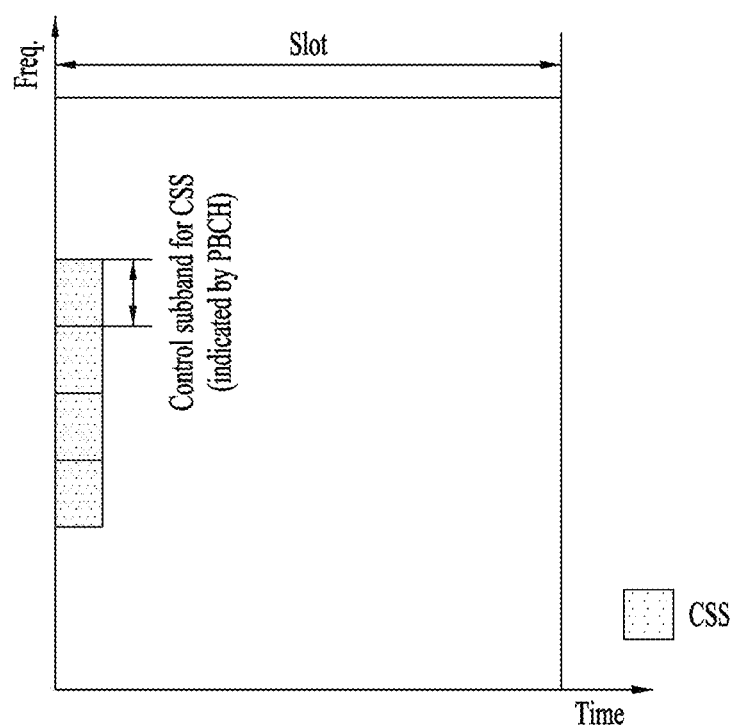
FIG. 17 is a diagram illustrating an example in which a (cell-specific) CSS resource position is indicated by a PBCH and is configured for a plurality of control subbands according to the present invention.

FIG. 17 is a diagram illustrating an example in which a (cell-specific) CSS resource position is indicated by a PBCH and is configured for a plurality of control subbands according to the present invention.

In FIG. 17, a cell-specific CSS configured for a plurality of control subbands may have the same purpose of use (i.e., the DCI types transmitted in each CSS may not be different)

The second embodiment based on the search spaces described above may be combined with other embodiments of the present invention as long as the second embodiment does not conflict with other embodiments.

3.3.3. Third Embodiment Based on Search Space

The UE may limit the number of times of blind detection to be performed on the CSS (on one carrier) to M. When multiple CSSs are configured, the UE may apply the M blind detections to the CSSs respectively.

Here, M may depend on the capability of the UE. In particular, M may depend on whether the UE monitors the USS/CSS and whether the UE monitors only the CSS.

Hereinafter, if a plurality of CSSs is configured, it is assumed that the number of blind detections that the UE may decode at one time on one carrier is limited. Here, the number of blind detections may depend on the capability of the UE, and may differ between a case where the UE monitors the USS/CSS and a case where the UE monitors only the CSS.

For example, in the case where the capability of the UE is 44 in one slot, the UE may allocate the number of times corresponding to 44 to the CSSs if the UE does not monitor the USS as in the case of RRC_IDLE. Alternatively, if the UE monitors the USS, the UE needs to divide and apply the number of times corresponding to 44 to the CSSs and USSs.

In addition, if the UE is not in the IDLE state, but there is a state in which the UE does not monitor the USS or a subset of the USS, the UE may divide and apply the number of times corresponding to 44 into the remaining CSSs except for BD for the USS.

If the UE receives configurations of a plurality of USSs and one or more of the USSs are dynamically/statically turned on/off, a BD allowed for one USS may be dynamically/statically changed.

For example, if the UE supports a carrier aggregation (CA) capability and a plurality of data subbands is configured for the UE on one carrier through the CA capability, the base station may separately configure a control subband for each data subband. In this case, the BD capability of the UE may be divided into and applied to several USSs. That is, the present invention proposes a method for dividing the BD capability of the UE into carriers, subbands, or SSs instead of limiting the number of BDs designated for each carrier as in conventional cases.

The change of the BD operation of the UE as described above may be indicated through a subband (or frequency) activation (or deactivation) procedure (or message). Alternatively, the BD capability of the UE as described above may be configured according to the USS configuration. In order to support this capability, capability signaling for signaling whether the UE supports the capability may be considered.

In addition, the BD capability of the UE may have dependency on the current numerology of the UE, and it may be assumed that the time unit used to measure the BD capability of the UE is X OFDM symbol(s) for each numerology. The BD capability of the UE may be signaled through capability signaling based on the default/reference numerology, and it may be assumed that the entire BD capability decreases as the subcarrier spacing increases.

Alternatively, the UE may separately send a report on each numerology as described above. This configuration may be effectively applied to use the capability of the UE to the maximum degree. However, when the UE capability is large, the configuration above may unnecessarily increase the number of BDs of the UE for a specific SS.

For example, assuming that the UE has a capability of aggregating 32 carriers and is capable of 32*44 BDs, the UE may apply the 32*44 BDs to one SS. In this case, unnecessary energy consumption of the UE may be caused. Therefore, it may be assumed that the maximum number of BDs that is applicable within a subband in which data is configured is separately set or the maximum number of BDs supported for each band is separately set.

Alternatively, the minimum number of BDs for each SS may be configured, and the network may configure the number of BDs exceeding the minimum value up to a case supported by the capability of the UE for each SS. Alternatively, the number of BDs of the UE may be proportional to the number of data subbands supported by the control SS.

The third embodiment based on the search spaces described above may be combined with other embodiments of the present invention as long as it does not conflict with other embodiments of the present invention.

3.3.4. Fourth Embodiment Based on Search Space

The base station may inform the UE of the SIB transmission scheme through a broadcast channel (e.g., PBCH) or paging (or DCI for scheduling paging), and the UE may send an SIB update request through a scheduling request (SR). Here, the SIB transmission scheme may be one of the following.

(1) Proactive SIB Update

The network performs the SIB update and transmits the updated SIB on the specified resource (2) Reactive SIB Update The network transmits an SIB update query, and the UE requiring the SIB update makes a request to the network.

If there is a UE requesting an SIB update, the network implements the SIB update on a broadcast channel or a unicast channel.

In the NR system to which the present invention is applicable, implementing the SIB update on a broadcast/unicast channel only when there is a UE requesting the SIB update is considered. In this case, the network may trigger an SIB update query message to check whether there is a UE requesting an SIB update. The message may be configured to be transmitted to multiple unspecified targets, and therefore may be transmitted in a similar manner to the paging message.

If a UE receiving the message needs an SIB update, the UE may receive SIB update information by transmitting an RACH in a procedure similar to the RRC connection procedure, or may monitor the SIB at a designated time indicated in the SIB update request message.

Alternatively, the UE receiving the SIB update request may transmit a scheduling request (SR) to the network to make an SIB update request. Here, the SR may add a field or bit information indicating a request for SIB update.

Alternatively, a separate resource for the SIB update request may be configured, and the UE may perform a response to the SIB update query using the separate resource. The separate resource may be a resource in which transmission through contention is assumed, and may be shared with a resource for transmitting a buffer state report (BSR).

Alternatively, the SIB update request may be transmitted in combination with the BSR. More specifically, the UE may transmit an SIB update request only when an opportunity to send a BSR is given. At this time, if the UE is in the RRC_IDLE or RRC_Semi-IDLE mode (i.e., not in the connection mode), the UE may not transmit the SIB update request until the UE establishes a connection or receives a paging request.

However, a mandate update may be designated for a specific SIB update request because the SIB update may include information about paging and the like. In other words, the UE receiving the SIB update query must perform SIB update.

Such SIB may be transmitted in a proactive manner. In other words, after message transmission as described above, the UE may need to perform SIB update within a designated time.

The query message itself may be transmitted in a manner similar to paging. In this case, the network may transmit, through one-field information in the DCI for scheduling paging, SIB update (the proactive SIB update scheme—the network performs SIB update and the updated SIB is transmitted in a designated resource), SIB update (reactive SIB update scheme trigger—scanning a UE which needs SIB update and implementing SIB update information through broadcast or unicast if there is such a UE), and paging so as to be distinguished from each other.

The fourth embodiment based on the search spaces described above may be combined with other embodiments of the present invention as long as it does not conflict with other embodiments.

3.3.5. Fifth Embodiment Based on Search Space

In configuring a CSS for a UE, the base station may configure the CSS such that the data region and the CSS transmission region are subjected to FDM on the basis of a data transmission unit (e.g., Physical Resource Block (PRB)).

Here, the CSS transmission region may include a plurality of PRBs and may be configured to have a time gap of a certain time or more from the start point in time of an SF/slot.

For example, it is assumed that the base station configures a (cell-specific) CSS and TDM is employed as a method for multiplexing between the (cell-specific) CSS and data as in the first embodiment based on search spaces as described above.

In this case, in order to transmit data, the UE must perform rate matching on the CSS region in consideration of TDM. In particular, if the resource allocation method for data is to allocate frequency-dimension resources, the rate matching process considering the TDM-subjected resources may generate an exception in performing resource allocation, thereby complicating the UE operation.

Thus, in this embodiment, a simple method for FDM of the CSS and data is proposed.

Figure 18:
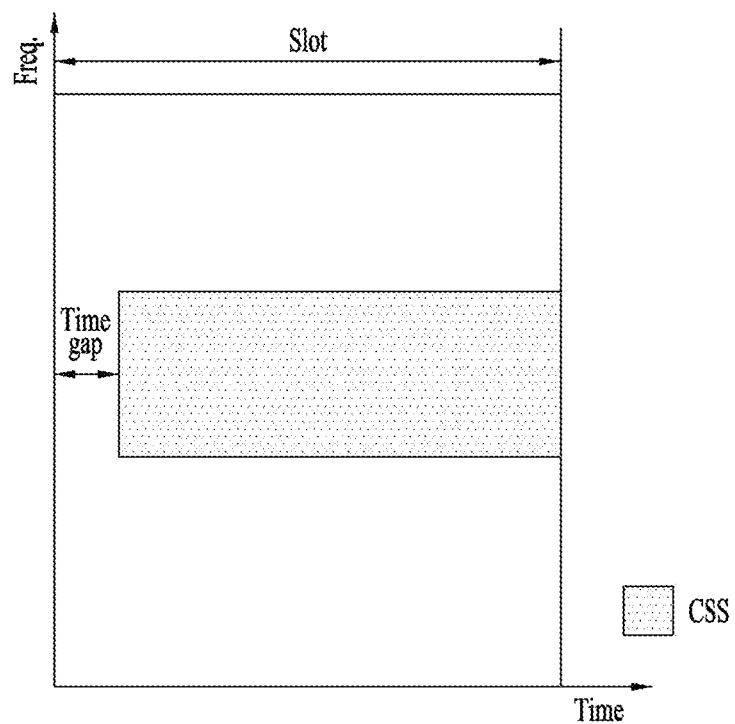
FIG. 18 is a diagram schematically illustrating a structure in which a CSS transmission region and data are subjected to FDM according to an embodiment of the present invention.

FIG. 18 is a diagram schematically illustrating a structure in which a CSS transmission region and data are subjected to FDM according to an embodiment of the present invention.

As shown in FIG. 18, when the CSS transmission region is designed to be subjected to FDM with data, the UE may transmit the data by performing resource allocation alone without separately performing rate matching for the CSS transmission region.

At this time, if the CSS is a (cell specific) CSS, a time gap of a predetermined time or more from the start time of the SF may be configured for the CSS to ensure a retuning time for UEs which are not included in the UE RF BW.

The fifth embodiment based on search spaces described above may be combined with other embodiments of the present invention as long as it does not conflict with other embodiments of the present invention.

3.3.6. Sixth Embodiment Based on Search Space

The base station may configure a (UE and/or group specific) CSS having an indicated resource region (e.g., time and frequency resources) for a UE through a higher layer signal (e.g., RRC signaling) if necessary, and the UE may detect scheduling DCI (or DCI) for one or more of the following data in the (UE and/or group specific) CSS:

Paging;
SC-PTM (single cell-point to multiple UE);
MBMS;
TPC;
Response or broadcast request messages to a group of UEs (e.g., SIB update query)
Fallback messages such as RRC configuration messages.

Here, when there is a plurality of (UE and/or group specific) CSSs, the CSSs may have physically (or logically) distinguished resources. In one example, the CSSs may be configured in different subbands. Alternatively, the CSSs may be configured separately in certain resources within the same subband. In this case, the resources for the respective CSSs may partially overlap.

In addition, the DCI transmitted through each (UE and/or group specific) CSS may be distinguished by the purpose of use. For example, CSS-fallback and CSS-paging may be distinguished from each other.

In addition, the (UE and/or group specific) CSS may be configured in a resource differentiated in the frequency dimension from the (cell-specific) CSS of the second embodiment based on the search spaces described above.

Further, the numerology applied to the (UE and/or group specific) CSS may be configured by the base station through a higher layer signal (e.g., RRC signaling) and may be configured independently from the numerology applied to the (self-specific) CSS. Alternatively, the numerology applied to the (UE and/or group specific) CSS may conform to the numerology applied to the USS configured for the same UE and/or group.

More specifically, in the case where a cell specific CSS is configured as in the second embodiment based on the search spaces as described above, if the UE reception band (UE RX BW) of the UE is configured not to include the (cell specific) CSS, the UE needs to perform an RF retuning process (i.e., the process of changing the center frequency) to monitor (or read) the CSS. However, since broadcast-related data such as SC-PTM or MBMS may be transmitted to the UE at any point in time, the UE should be capable of detecting DCI related to the transmitted SC-PRM or MBMS from time to time.

In this embodiment, a scheme is proposed in which a UE and/or group specific CSS is configured through a higher layer signal, and the UE detects DCI about at least the SC-PTM and the MBMS (and/or paging, DCI about TPC) in the (UE and/or group specific) CSS.

Figure 19:
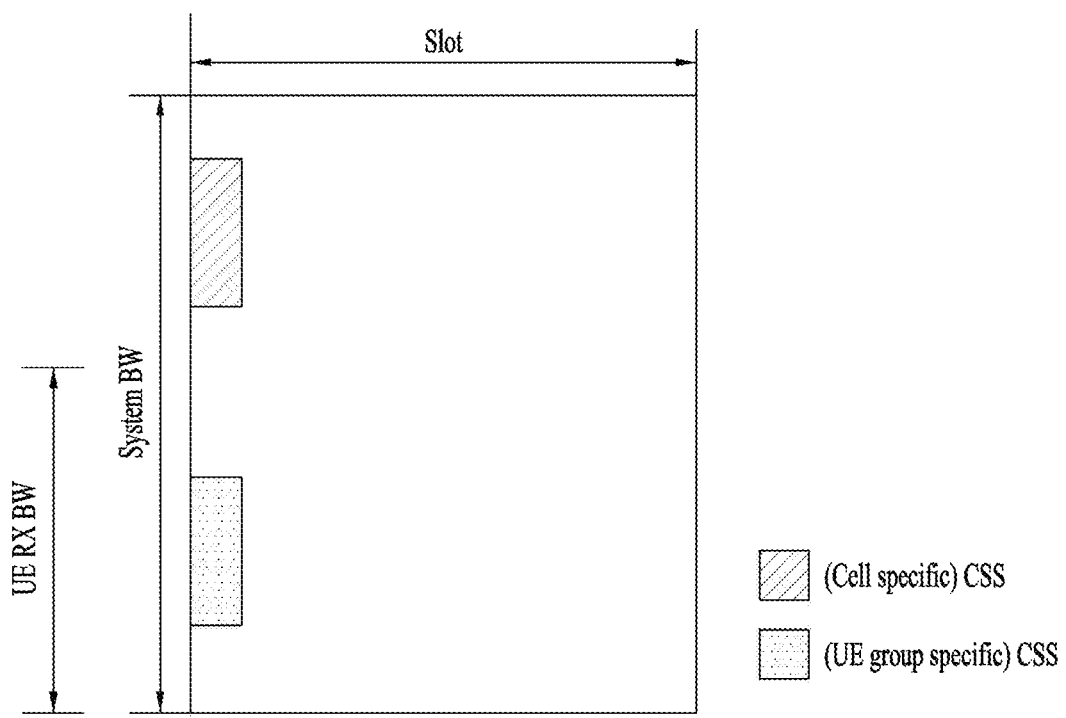
FIG. 19 is a diagram illustrating an example in which a base station configures a separate (UE group specific) CSS when the UE RX BW of a UE is smaller than the system bandwidth and does not include a cell-specific CSS according to the present invention.

FIG. 19 is a diagram illustrating an example in which a base station configures a separate (UE group specific) CSS when the UE RX BW of a UE is smaller than the system bandwidth and does not include a cell-specific CSS according to the present invention.

In FIG. 19, the (UE group specific) CSS may be a common resource region in which some UEs configured by the base station perform DCI detection.

The sixth embodiment based on the search spaces described above may be combined with other embodiments of the present invention as long as it does not conflict with other embodiments.

3.3.7. Seventh Embodiment Based on Search Space

The base station may configure, for the UE, one or more USSs in which a resource region (e.g., time and frequency resources) is indicated through a higher layer signal (e.g., RRC signaling), and the UE may detect scheduling DCI about unicast data in the USSs.

Here, when there is a plurality of USSs, USSs may have physically (or logically) distinguished resources. For example, the USSs may be configured in different symbol resources.

Alternatively, the USSs may be transmitted in different data subbands. Alternatively, the USSs may be assigned to different PRB resources in one subband. In this case, the physical resources for the plurality of USSs may partially/fully overlap.

In the present invention, a UE may have a configuration of a plurality of USSs, and a base station may configure whether a UE-specific DM-RS or UE shared (or common) DM-RS is to be applied for each USS.

Here, the resource region in which the shared (or common) DM-RS is applied in the USSs may also be used as a (UE group specific) CSS. Alternatively, the UE may assume that a shared (or common) DM-RS is applied in a region configured as the (UE group specific) CSS, and the (UE group specific) CSS may be changed dynamically/statically in the corresponding USS(s).

More specifically, if the US receives a configuration of a USS from the base station through a higher layer signal and RRC reconfiguration for the USS is applied, the DL control detection operation of the UE may not be supported in the USS.

To address this issue, the UE may attempt DL control detection in a (cell specific) CSS region. However, if the UE RX BW of the UE does not include the cell specific CSS region, the UE should perform an RF retuning process to detect the (cell specific) CSS, and therefore cannot perform a continuous DL control region detection operation.

Accordingly, in this embodiment, a scheme is proposed in which, when a base station configures a plurality of USSs for a UE and performs reconfiguration of a specific USS, a fallback operation is supported in one of the remaining USSs.

In addition, the base station may configure, for the UE, whether to apply a UE-specific DM-RS or a UE shared (or common) DM-RS in each USS, and a USS in which the UE shared (or common) DM-RS is applied may also be used as a (UE group specific) CSS.

The seventh embodiment based on the search spaces described above may be combined with other embodiments of the present invention as long as it does not conflict with other embodiments.

3.3.8. Eighth Embodiment Based on Search Space

When a base station configures a USS for a UE, the base station may instruct UE-specific DM-RS-based detection for a specific physical (or logical) resource region in the USS and instruct shared (or common) DM-RS-based detection for another distinguished physical (or logical) resource region in the same USS, through a higher layer signal (e.g., RRC signaling).

Here, the resource region in which the common (or common) DM-RS is applied in the USS may also be used as a (UE group specific) CSS.

Figure 20:
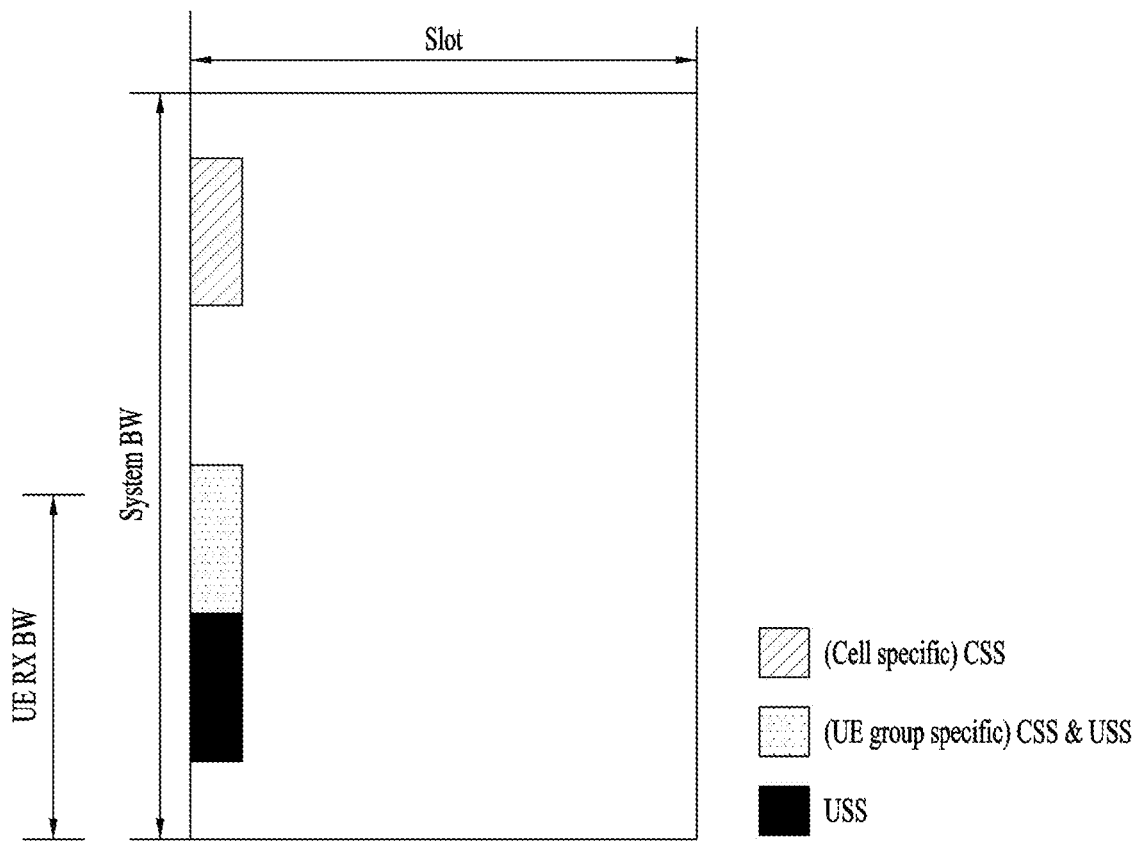
FIG. 20 is a diagram illustrating an example in which a UE specific DM-RS or a UE shared (or common) DM-RS is applied to different resource regions in one USS according to the present invention.

FIG. 20 is a diagram illustrating an example in which a UE specific DM-RS or a UE shared (or common) DM-RS is applied to different resource regions in one USS according to the present invention.

As shown in FIG. 20, this embodiment proposes a scheme in which one USS supports UE-specific DM-RS and UE-shared (or common) DM-RS simultaneously.

For example, the base station may configure one USS for the UE such that the UE-specific DM-RS (USS in FIG. 20) is applied to some physical (or logical) resources in the USS and the UE shared (or common) DM-RS is applied to the remaining physical (or logical) resources ((UE group specific) CSS & USS in FIG. 20). Here, the USS to which the UE shared (or common) DM-RS is applied may also be used as a (UE group specific) CSS.

The eighth embodiment based on the search spaces described above may be combined with other embodiments of the present invention as long as it does not conflict with other embodiments.

3.3.9. Ninth Embodiment Based on Search Space

When the base station configures a USS and a CSS in the same control subband, the USS and CSS may be multiplexed using one of the following schemes.

(1) TDM (e.g., OFDM symbol)

(2) FDM (e.g., PRB)

(3) Overlaid structure. In other words, the USS and CSS may partially or fully overlap in terms of physical resources, and the UE may perform blind detection on the USS and the CSS in a certain order. For example, the UE may perform blind detection on the USS and then perform blind detection on the CSS.

(4) Divide into search space candidates

For example, it is assumed that CCEs 1 to M are designated as a CSS, and the USS is CCEs M+1 to N (where N is the max CCE index in a CSS/USS subband). When the base station adopts hashing from the perspective of transmission or the UE adopts hashing from the perspective of reception, hashing may be performed in N-M CCEs if hashing of the USS is used, and hashing may be performed in M CCEs if hashing of the CSS is used.

In this case, the base station may configure a scheme of multiplexing between the CSS and the USS for the UE through a higher layer signal.

As in the previous embodiment, the scheme in which the UE-shared DM-RS is applied to some of a plurality of USSs or some resources in a USS and a USS region to which the UE shared DM-RS is applied is used as a (UE group specific) CSS may be included in the operation corresponding to scheme (3) of this embodiment. That is, according to the operation corresponding to scheme (3) of this embodiment, the USS and the CSS may partially or fully overlap in terms of physical (or logical) resources.

However, when hybrid beamforming is applied in a high frequency band of 6 GHz or more, analog beams applied to the USS and the CSS may be different from each other. In this case, TDM may be employed between the USS and the CSS. Accordingly, the base station may configure/change a CSS and USS multiplexing scheme for the UE through a higher layer signal.

The ninth embodiment based on the search spaces described above may be combined with other embodiments of the present invention as long as it does not conflict with other embodiments.

3.3.10. Tenth Embodiment Based on Search Space

According to the present invention, the (UE group specific) CSS may be configured as follows.

(1) One or several USSs among a plurality of USSs may be configured as USSs and (UE group specific) CSSs. In particular, if a plurality of (UE group specific) CSSs is configured, the detection DCIs for the respective CSSs may be distinguished from each other or coexist.

(2) All USSs may also be configured as CSSs.

In particular, an SS that may be shared by the USS/CSS may be distinguished using the following methods:

1) Configure a part of the SS so as to be used for the CSS:
Configure SS candidates separately in the USS/CSS;
Configure a specific time resource so as to be used in the CSS;
Configure a specific frequency resource so as to be used in the CSS;

2) Configure the entire SS so as to be usable as a CSS.

Here, when the USS is mapped to CSS resources, the USS may be configured to conform to rules such as the DM-RS, CCE mapping, and TX scheme of the CSS. In other words, the USS may be transmitted according to a DM-RS transmission scheme, a CCE mapping scheme, a TX scheme, or the like applied to the CSS (not schemes applied to the USS).

For example, the UE may assume that the shared RS is used in an overlapping resource. In the opposite case, however, it may be difficult to use UE specific beamforming or the like.

Alternatively, the UE may be configured to perform BD for both the USS and the (UE group specific) CSS. This scheme may be regarded as allowing the UE to configure a separate (UE/group specific) CSS. The configuration for the (UE/group specific) CSS may include a PRB set and OFDM symbol(s) (for CSS transmission resources). Even when the (UE/group specific) CSS is separately configured, it is assumed that the CSS and USS are configured in a (UE specific) BW in which the UE is capable of receiving the same. In addition, a DL grant through which the UE schedules (UE-specific) data in the (UE/group specific) CSS and whether to detect the DL grant may be configured (by the base station), or the UE may be basically configured to implement only the DL grant for scheduling (UE-specific) data and detection of the UL grant.

The tenth embodiment based on the search spaces described above may be combined with other embodiments of the present invention as long as it does not conflict with other embodiments.

3.4. Additional Features 3.4.1. First Additional Embodiment

The base station may inform the UE of N control region sets to be considered in transmitting data. When data transmission (for some resources) in the control region sets is instructed, the base station may announce whether data transmission is possible using one of the following methods.

(1) Data transmission is not performed in the N control region sets.

This operation may be a default operation.

(2) The base station indicates whether data transmission is possible in each control region (if there is data to be transmitted) using a bitmap of N bits in the scheduling DCI.

(3) When the base station instructs data transmission for M resource blocks through first scheduling DCI, it indicates whether or not data transmission is possible in RB-specific control regions of M RBs using second scheduling DCI (assigned resources the amount of which is proportional to the number of data transmission RBs) in the data transmission region (if there is data to be transmitted).

At this time, even the number of data transmission symbols in the RB-specific control region may be additionally indicated.

Here, the UE may assume that data transmission has been instructed first for a scheduled resource region, and determine whether to exclude the control region from the data transmission region according to the first additional embodiment described above.

More specifically, in the case where one or more DL control regions are configured as in the embodiment described above, the UE may transmit data only when data transmission is instructed for some resources in the DL control regions and there is no DCI transmission in the corresponding DL control region.

Thus, according to a simple embodiment, the base station may inform the UE of a resource region for a plurality of DL control regions, and the UE may be restricted not to perform data transmission in the corresponding region. However, this operation may not be efficient in terms of resource utilization because, even if there are available resources as no DCI transmission actually occurs in the DL control region, the UE cannot use the resources for data transmission.

Thus, as an additional scheme, the base station may indicate, through the scheduling DCI, whether data transmission is possible for each DL control region (if there is data to be transmitted in the corresponding region). Furthermore, the base station may indicate whether data transmission is possible in the control region on the basis of an RB unit, which is a frequency-dimension basic resource allocation unit.

However, if the possibility of data transmission is indicated on the RB unit basis, signaling overhead may be high depending on the number of data RBs allocated to the UE. Therefore, the base station may indicate whether data transmission is possible, using the second scheduling DCI, whose resources may increase in number in proportion to the number of data RBs in the data transmission region. In this case, as the number of data RBs increases, the signaling overhead may increase, but the number of resources for transmission of second scheduling DCI may also increase. Therefore, a fixed signaling overhead rate may be maintained.

Additionally, if DCI indicating data scheduling indicates State 0 through a specific field in the DCI, the UE may assume that there is no data transmission in the DL control region configured for the UE. If the DCI indicating data scheduling indicates State 1, the UE may assume that data transmission is restricted in resource element (RE) resources for the DCI for scheduling the data in the transmission region scheduled by the corresponding DCI, but is allowed in the remaining scheduling region. That is, if the DCI indicating the data scheduling indicates State 1, the UE may perform rate matching only on the DCI for scheduling data for the UE. If the DCI indicating the data scheduling indicates State 2, the UE may assume that there is no DL control region restricted (or excluded) for data transmission within the scheduled data transmission region.

The first additional embodiment described above may be combined with other embodiments of the present invention as long as it does not conflict with other embodiments.

3.4.2. Second Additional Embodiment

When a basic unit constituting the search space in a specific DL control region is defined as a control channel element (CCE) (or resource element group (REG)), the absolute size of time and frequency resources in which the CCE (or REG) is defined is the same for a plurality of numerologies, but the number of symbols and the number of subcarriers may vary among the numerologies.

For example, a value obtained by multiplying the number of symbols by the number of subcarriers in the CCE (or REG) may be configured to be the same for the respective numerologies. In this case, the number of symbols and the number of subcarriers may be proportional or inversely proportional to the subcarrier spacing of each numerology that is actually applied.

In the case where control regions having a plurality of numerologies overlap on the same resource, DCI multiplexing between different numerologies may be complicated if the absolute size of time and frequency resources of the CCE (or REG), which is the basic configuration unit of the search region differs from one numerology to another.

Figure 21:
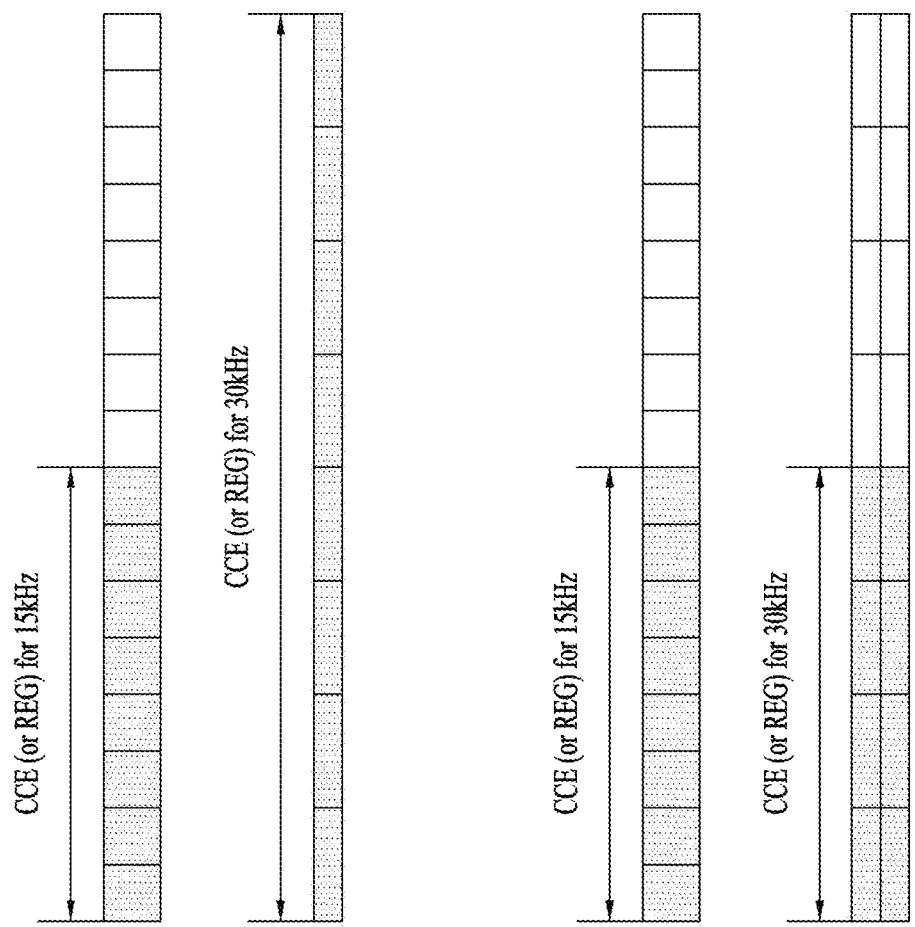
FIG. 21 is a diagram schematically illustrating a CCE structure for each applied numerology according to an embodiment of the present invention.

FIG. 21 is a diagram schematically illustrating a CCE structure for each applied numerology according to an embodiment of the present invention.

Shown on the left in FIG. 21 is an example in which one CCE (or REG) is composed of one symbol and eight subcarriers for a 15 kHz subcarrier spacing and a 30 kHz subcarrier spacing. In this example, one CCE (or REG) for the 30 kHz subcarrier spacing may overlap two CCEs (or REGs) for the 15 kHz subcarrier spacing. Thereby, DCI blockage may be worsened.

On the other hand, according to this embodiment, one CCE (or REG) for the 30 kHz subcarrier spacing may be composed of two symbols and four subcarriers, and therefore overlap one CCE (or REG) for the 15 kHz subcarrier spacing, as shown on the right in FIG. 21. Therefore, DCI blockage may be mitigated.

The second additional embodiment described above may be combined with other embodiments of the present invention as long as it does not conflict with other embodiments.

3.4.3. Third Additional Embodiment

When the subcarrier spacing (SC) for the DL control transmission region (SC 1) is N times (where N is an integer greater than or equal to 1) the SC for the data transmission region (SC 2) in the same SF (or TTI), signals for each symbol in the DL control transmission region may be generated based on SC 1 in the frequency domain (e.g., [X0, X1, . . . , XL]). Then, in actual transmission, N−1 samples of zeros may be inserted between the frequency-dimension samples (e.g., [X0, 0, . . . , 0, X1, 0, . . . , 0, . . . XL-1, 0, . . . , 0, XL], i.e., N−1 zeros may be inserted between Xk and Xk+1) and the N*L frequency-dimension samples may be transmitted based on SC 2.

Alternatively, when the symbol length (SYM 1) for the DL control transmission region is 1/N (where N is an integer greater than or equal to 1) times the symbol length (SYM 2) for the data transmission region in the same SF (or TTI), the signal for each symbol in the DL control transmission region may be repeatedly transmitted for N symbols (with respect to SYM 1).

In the NR system to which the present invention is applicable, when it is desired to dynamically change the numerology for the data transmission region, the numerology for the DL control transmission region may be fixed or semi-statically configured in order to reduce the blind detection burden on the UE.

In this case, if the SC for the DL control region is N times the SC for the data transmission region, the symbol length of the DL control transmission region becomes 1/N times the symbol length of the data transmission region. In this case, DL control transmission may be performed only on some (e.g., 1/N) symbols of the first data transmission symbols from the perspective of data transmission. In the remaining (N−1)/N of the symbol length, rate-matched data may be transmitted or data transmission may be omitted. Such operation of sending data through an incomplete symbol length or not performing data transmission may not be preferable in terms of data transmission throughput.

To address this issue, it is necessary to multiplex a control signal and data in corresponding symbols. Therefore, in this embodiment, it is proposed that data per symbol in the DL control transmission region be repeatedly transmitted over N symbols.

Figure 22:
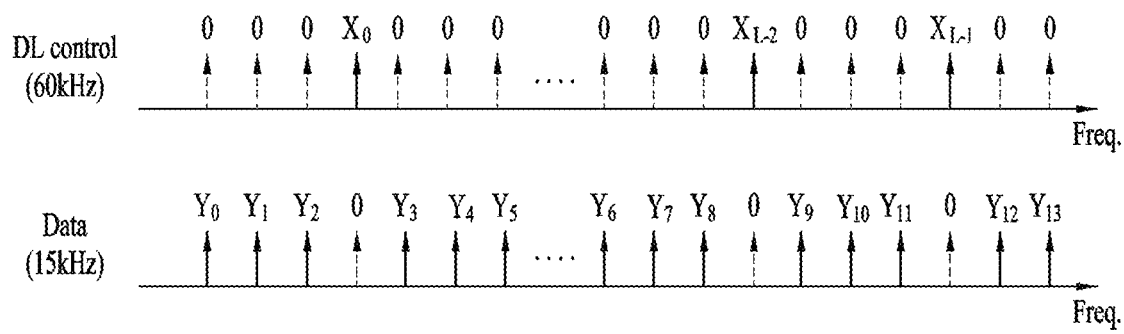
FIG. 22 is a diagram schematically illustrating a configuration in which a DL control signal and a data signal are transmitted according to an embodiment of the present invention.

FIG. 22 is a diagram schematically illustrating a configuration in which a DL control signal and a data signal are transmitted according to an embodiment of the present invention.

In FIG. 22, it is assumed that the SC for the DL control transmission region is 60 kHz, and the SC for the data transmission region is 15 kHz. In this case, FIG. 22 shows a configuration in which the DL control signal and the data are subjected to FDM in symbols on the basis of 15 kHz when data transmission per symbol is repeated four times in the DL control transmission region.

As shown in FIG. 22, the time-dimension repeated transmission may be implemented as a zero insertion operation in the frequency domain. As such, the DL control signal and data (within the first symbol with respect to 15 kHz) may be multiplexed in the frequency domain.

The third additional embodiment described above may be combined with other embodiments of the present invention as long as it does not conflict with other embodiments.

3.4.4. Fourth Additional Embodiment

After the base station configures a DL control region with N1 leading symbols in a specific SF (or TTI) and a UL control region with N2 back symbols, the base station may transmit one of the following DCIs through the DL control region:

(1) Unicast data scheduling information (for the fallback operation);

(2) System information (or broadcast data) scheduling information.

In response, when the UE succeeds in detecting the DCI in a specific symbol in the DL control region, the UE may transmit ACK (for DCI reception) in a symbol corresponding to the specific symbol in the UL control region (of the same SF (or TTI)).

Here, a beam sweeping operation of changing the analog beam direction (for each TXRU) for a plurality of symbols (or time resources) may be applied to the DL control region and the UL control region.

In addition, in attempting DCI detection, the UE may attempt detection (for example, blind detection) after combining signals for a plurality of symbols (at the symbol level).

When DCI detection is successful, the UE may attempt to receive data for N1 SFs (or TTIs) (determined as a time interval relative to the DL control region to which the beam sweeping operation is applied), assuming data transmission based on an analog beam applied in a corresponding symbol. Then, if the UE receives data even once, it may stop the reception attempt.

More specifically, when the base station performs a multi-beam operation, the base station may fail to obtain information about an analog beam receivable by the UE if the UE wakes up after stopping transmission and reception for a long time or moves at a high speed. In this case, data transmission to the UE from the base station by applying the beam sweeping operation using a plurality of analog beams may be considered as the fallback operation.

In this case, the base station needs to apply the beam sweeping operation to the scheduling DCI before data transmission. If the UE is capable of quickly responding to indicate an analog beam through which detection of the beam-swept DCI has been successful, the base station may perform data transmission only through the analog beams(s) in which the ACK of the UE is present without having to transmit data with respect to all analog beams through beam sweeping.

Figure 23:
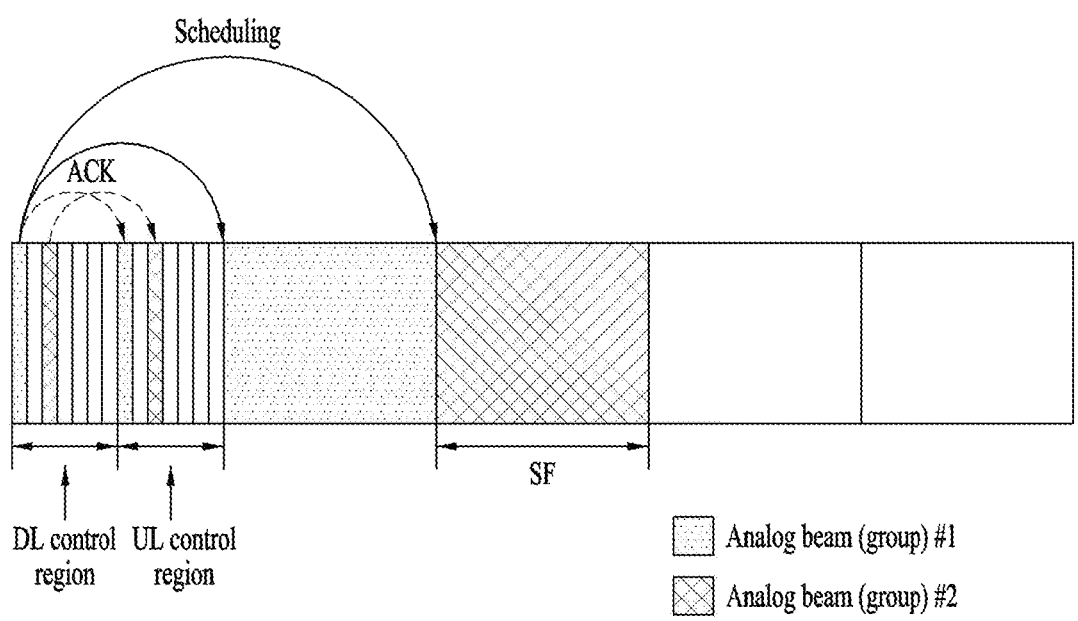
FIG. 23 is a diagram illustrating an operation of a base station of transmitting a DL control region by applying a beam sweep operation and transmitting data (without a separate beam sweeping operation) with respect to an analog beam through which ACK of a UE has been received.

FIG. 23 is a diagram illustrating an operation of a base station of transmitting a DL control region by applying a beam sweep operation and transmitting data (without a separate beam sweeping operation) with respect to an analog beam through which ACK of a UE has been received.

As shown in FIG. 23, in a single SF (or TTI) composed of 14 symbols, the base station may configure the seven leading symbols as a DL control region to which the beam sweeping operation is applied and can configure the back seven symbols in the second half of the SF as a UL control region to which the beam sweeping operation is applied. In this case, if the UE detects scheduling DCI for the fallback operation in the k-th symbol in the DL control region, the UE may transmit an acknowledgement (ACK) for the DCI in the k-th symbol in the UL control region.

Thereafter, the UE may attempt to receive the detected DCI-based data transmission for seven SF intervals corresponding to the DL control region to which beam sweeping is applied. If UE 1 succeeds in DCI detection in the first symbol in the DL control region to which the beam sweeping operation is applied and then reports an ACK, and UE 2 succeeds in DCI detection in the third symbol and then reports an ACK, the base station may perform data transmission by applying, only to two SFs of the seven SF intervals, the analog beam applied to the first symbol and the analog beam applied to the third symbol, respectively.

The fourth additional embodiment described above may be combined with other embodiments of the present invention as long as it does not conflict with other embodiments.

3.4.5. Fifth Additional Embodiment

The base station may expect ACK transmission (for DCI reception) from the UE for at least one DCI of the following (in the UL control region in the same TTI), or instruct the same through a specific field in the DCI:

(1) DCI indicating multi-TTI scheduling;
(2) DCI indicating multi-shot DL measurement RS transmission.

More specifically, if the UE fails to receive DCI when the base station indicates multi-TTI scheduling or multi-shot DL measurement RS transmission through the DCI, the multi-TTI or the multi-shot DL measurement RS may unnecessarily reserve a DL resource. That is, the resource is neither expected to be used by the UE, nor allowed to be switched for another use.

In order to address this issue, the base station may instruct the UE to feed back whether reception of the DCI is successful or expect at least an indication of whether reception of a specific DCI is successful.

For example, if there is no ACK from the UE, the base station may determine that DCI transmission has failed and may skip scheduling or DL RS transmission thereafter. The ACK for the DCI may be applied to any DCI for which it takes relatively little time for the UE to respond. For example, the UE may transmit an indication of whether or not reception is successful in the form of ACK even for DCI for indicating DL RS transmission or DCI for indicating measurement.

The fifth additional embodiment described above may be combined with other embodiments of the present invention as long as it does not conflict with other embodiments.

3.4.6. Sixth Additional Embodiment

When a resource grid consisting of M resource units (which is pre-agreed or configurable through a higher layer signal) in a specific data transmission region is defined (for each numerology) is defined, and a search space for detecting DCI is configured in each resource unit, the UE may detect DCI according to the resource grid conforming to the numerology whose configuration has been received by the UE for data transmission. For the DCI, resource allocation (for data transmission) may be performed on the resource unit basis.

Here, a plurality of resource grids may be defined and the UE may perform DCI detection according to the plurality of resource grids.

In addition, the base station may transmit a configuration to the UE through a higher layer signal to indicate whether DCI is to be detected in the DL control region or to be detected the DCI according to this embodiment.

More specifically, for example, when the entire system bandwidth is composed of 100 resource blocks (RBs), the base station defines five consecutive RBs as one resource unit and assumes that each resource unit has two DCI candidates (e.g., two coupling levels).

In this case, the UE may attempt DCI detection all (100/5)*2=40 times. At this time, the DCI may perform resource allocation (for data transmission) using the resource unit as a default resource allocation unit. As a result, the UE may assume that there is only DCI indicating data scheduling of the UE in a data region which is scheduled for the UE. However, in this case, the minimum granularity for resource allocation for the UE is limited (to, for example, 5 RBs). Accordingly, the operation described above may be useful when flexibility of latency and resource allocation is not significantly required as in the case of the MTC UE.

Figure 24:
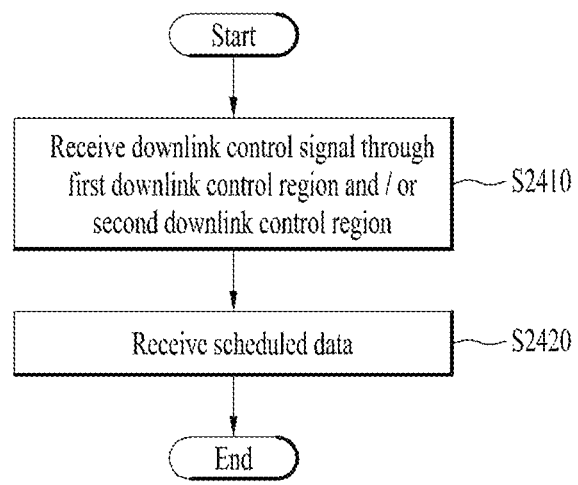
FIG. 24 is a flowchart illustrating a signal reception method of a UE according to the present invention.

FIG. 24 is a flowchart illustrating a signal reception method of a UE according to the present invention.

As shown in FIG. 24, the UE receives a downlink control signal through a first downlink control region and/or a second downlink control region (S2410). Here, the first downlink control region may be indicated by system information, and the second downlink control region may be configured by the base station. For example, the second downlink control region may be configured by a higher layer signal (e.g., RRC signaling) transmitted from the base station.

Next, the UE receives data scheduled by the control information (S2420).

In the present invention, the first downlink control region may be defined by system information as follows.

First, the time resource of the first downlink control region may be a transmission time interval in which the system information is transmitted. In addition, the frequency resource of the first downlink control region may be a frequency band indicated by the system information. In addition, the numerology applied to the first downlink control region may be a numerology indicated by the system information.

In particular, when the control information is transmitted through the first downlink control region, the control information may include numerology information about scheduling target data, information about a subband in which the scheduling target data is transmitted, and time-dimension offset information for the scheduling target data.

For example, when the control information is transmitted through the first downlink control region, the numerology applied to the control information may be different from the numerology of the scheduling target data.

In another example, when the control information is transmitted through the first downlink control region, a different type of demodulation reference signal (DM-RS) scrambling may be applied to the control information depending on the type of the control information.

In this case, when a plurality of transmission reception points is included in one cell operated by the base station, one of first DM-RS scrambling, which is not distinguished by the respective transmission reception points, and second DM-RS scrambling, which is not distinguished by the respective transmission reception points in the one cell, may be applied.

In the present invention, the numerology applied to the second downlink control region configured by the base station may be identical to the numerology for the data scheduled by the control information.

When the control information is transmitted through the second downlink control region, the control information may include information about presence or absence of a search space in the second downlink control region, detection start time information about the search space included in the second downlink control region, and information about the number of times of blind detection for the second downlink control region.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

FIG. 25 is a diagram illustrating configurations of a UE and a base station capable of being implemented by the embodiments proposed in the present invention. The UE and the base station shown in FIG. 25 operate to implement the embodiments of the method for transmitting and receiving signals between the UE and the base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured as described above receives, through the receiver 20, control information through at least one of a first downlink control region indicated by system information and a second downlink control region configured by the base station. Then, the UE 1 receives, through the receiver 20, data scheduled by the control information.

Correspondingly, the base station 100 transmits, via the transmitter 110, control information through at least one of the first downlink control region indicated by the system information and the second downlink control region configured by the base station, and transmits data scheduled by the control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 25 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method for receiving a signal from a base station by a user equipment in a wireless communication system, the method comprising:
   receiving control information through at least one of a first downlink control region or a second downlink control region; and
   receiving data scheduled by the control information,
   wherein the first downlink control region is indicated by system information,
   wherein the second downlink control region is configured by the base station,
   wherein based on the control information being received through the first downlink control region, the control information comprises (i) information regarding a subband in which scheduling target data is transmitted, (ii) information regarding a numerology of the scheduling target data, and (iii) time-dimension offset information regarding the scheduling target data, and
   wherein based on the control information being received through the second downlink control region, the control information comprises (i) information regarding a presence or absence of a search space in the second downlink control region, (ii) detection time information regarding a search space included in the second downlink control region, and (iii) information regarding a number of times of blind detection for the second downlink control region.

2. The method according to claim 1, wherein a time resource of the first downlink control region corresponds to a transmission time interval in which the system information is transmitted,
   wherein a frequency resource of the first downlink control region corresponds to a frequency band indicated by the system information, and
   wherein a subcarrier spacing applied to the first downlink control region is indicated by the system information.

3. The method according to claim 1, wherein, based on the control information being received through the first downlink control region, a subcarrier spacing applied to the control information is different from a subcarrier spacing of the scheduling target data.

4. The method according to claim 1, wherein, based on the control information being received through the first downlink control region, different demodulation reference signal (DM-RS) scrambling is applied to the control information according to a type of the control information.

5. The method according to claim 4, wherein, based on a plurality of transmission reception points being included in a cell operated by the base station, the different DM-RS scrambling comprises:
   first DM-RS scrambling distinguished for each of the transmission reception points; and
   second DM-RS scrambling configured not to be distinguished for each of the transmission reception points in the cell.

6. The method according to claim 1, wherein a subcarrier spacing applied to the second downlink control region is identical to a subcarrier spacing for the data scheduled by the control information.

7. A method for transmitting a signal to a user equipment by a base station in a wireless communication system, the method comprising:
   transmitting control information through at least one of a first downlink control region or a second downlink control region; and
   transmitting data scheduled by the control information,
   wherein the first downlink control region is indicated by system information,
   wherein the second downlink control region is configured by the base station,
   wherein based on the control information being transmitted through the first downlink control region, the control information comprises (i) information regarding a subband in which scheduling target data is transmitted, (ii) information regarding a numerology of the scheduling target data, and (iii) time-dimension offset information regarding the scheduling target data, and
   wherein based on the control information being transmitted through the second downlink control region, the control information comprises (i) information regarding a presence or absence of a search space in the second downlink control region, (ii) detection time information regarding a search space included in the second downlink control region, and (iii) information regarding a number of times of blind detection for the second downlink control region.

8. The method according to claim 7, wherein a time resource of the first downlink control region corresponds to a transmission time interval in which the system information is transmitted,
   wherein a frequency resource of the first downlink control region corresponds to a frequency band indicated by the system information, and
   wherein a subcarrier spacing applied to the first downlink control region is indicated by the system information.

9. The method according to claim 7, wherein, based on the control information being transmitted through the first downlink control region, a subcarrier spacing applied to the control information is different from a subcarrier spacing of the scheduling target data.

10. The method according to claim 7, wherein, based on the control information being transmitted through the first downlink control region, different demodulation reference signal (DM-RS) scrambling is applied to the control information according to a type of the control information.

11. The method according to claim 10, wherein, based on a plurality of transmission reception points being included in a cell operated by the base station, the different DM-RS scrambling comprises:
    first DM-RS scrambling distinguished for each of the transmission reception points; and
    second DM-RS scrambling configured not to be distinguished for each of the transmission reception points in the cell.

12. The method according to claim 7, wherein a subcarrier spacing applied to the second downlink control region is identical to a subcarrier spacing for the data scheduled by the control information.

13. A user equipment configured to receive a signal from a base station in a wireless communication system, the user equipment comprising:
a receiver; and
a processor connected to the receiver,
wherein the processor is configured to:
receive control information through at least one of a first downlink control region or a second downlink control region; and
receive data scheduled by the control information,
wherein the first downlink control region is indicated by system information,
wherein the second downlink control region is configured by the base station,
wherein based on the control information being received through the first downlink control region, the control information comprises (i) information regarding a subband in which scheduling target data is transmitted, (ii) information regarding a numerology of the scheduling target data, and (iii) time-dimension offset information regarding the scheduling target data, and
wherein based on the control information being received through the second downlink control region, the control information comprises (i) information regarding a presence or absence of a search space in the second downlink control region, (ii) detection time information regarding a search space included in the second downlink control region, and (iii) information regarding a number of times of blind detection for the second downlink control region.

14. The user equipment according to claim 13, wherein a time resource of the first downlink control region corresponds to a transmission time interval in which the system information is transmitted,
wherein a frequency resource of the first downlink control region corresponds to a frequency band indicated by the system information, and
wherein a subcarrier spacing applied to the first downlink control region is indicated by the system information.

15. A base station configured to transmit a signal to a user equipment in a wireless communication system, the base station comprising:
a transmitter; and
a processor connected to the transmitter,
wherein the processor is configured to:
transmit control information through at least one of a first downlink control region or a second downlink control region; and
transmit data scheduled by the control information,
wherein the first downlink control region is indicated by system information,
wherein the second downlink control region is configured by the base station,
wherein based on the control information being transmitted through the first downlink control region, the control information comprises (i) information regarding a subband in which scheduling target data is transmitted, (ii) information regarding a numerology of the scheduling target data, and (iii) time-dimension offset information regarding the scheduling target data, and
wherein based on the control information being transmitted through the second downlink control region, the control information comprises (i) information regarding a presence or absence of a search space in the second downlink control region, (ii) detection time information regarding a search space included in the second downlink control region, and (iii) information regarding a number of times of blind detection for the second downlink control region.

* * * * *